United States Patent
Shakespeare

(10) Patent No.: US 11,847,251 B1
(45) Date of Patent: Dec. 19, 2023

(54) PERMISSIONS-BASED COMMUNICATION OF INFORMATION

(71) Applicant: YouGov PLC, London (GB)

(72) Inventor: Stephan Shakespeare, London (GB)

(73) Assignee: YouGov PLC, London (GB)

( * ) Notice: Subject to any disclaimer, the term of this patent is extended or adjusted under 35 U.S.C. 154(b) by 0 days.

(21) Appl. No.: 18/141,325

(22) Filed: Apr. 28, 2023

Related U.S. Application Data

(63) Continuation of application No. 16/821,892, filed on Mar. 17, 2020, now abandoned.

(60) Provisional application No. 62/819,800, filed on Mar. 18, 2019.

(51) Int. Cl.
    *G06F 21/00*   (2013.01)
    *G06F 21/62*   (2013.01)
    *G06Q 30/0251* (2023.01)

(52) U.S. Cl.
    CPC ...... *G06F 21/6254* (2013.01); *G06F 21/6263* (2013.01); *G06Q 30/0251* (2013.01)

(58) Field of Classification Search
    CPC ............ G06F 21/6254; G06F 21/6263; G06Q 30/0251
    See application file for complete search history.

(56) References Cited

U.S. PATENT DOCUMENTS

| | | | |
|---|---|---|---|
| 2007/0067297 A1 | 3/2007 | Kublickis | |
| 2018/0225693 A1 | 8/2018 | Postrel | |
| 2018/0322597 A1 | 11/2018 | Sher | |
| 2019/0019208 A1 | 1/2019 | Postrel | |
| 2019/0028277 A1 | 1/2019 | Jayachandran et al. | |
| 2019/0050949 A1 | 2/2019 | Orsini | |
| 2019/0286843 A1 | 9/2019 | Fukuhara et al. | |
| 2019/0342336 A1 | 11/2019 | Finkelstein et al. | |
| 2019/0370866 A1 | 12/2019 | Lawbaugh et al. | |
| 2020/0005349 A1 | 1/2020 | Brody et al. | |
| 2020/0074102 A1 | 3/2020 | Pitti | |
| 2020/0133955 A1 | 4/2020 | Padmanabhan et al. | |
| 2020/0134656 A1 | 4/2020 | Padmanabhan | |
| 2020/0204557 A1 | 6/2020 | Singh et al. | |
| 2020/0258099 A1* | 8/2020 | Alghamdi | G06Q 30/0261 |
| 2020/0329018 A1 | 10/2020 | Tali et al. | |
| 2021/0150521 A1* | 5/2021 | Pan | G06Q 30/06 |

FOREIGN PATENT DOCUMENTS

| | | |
|---|---|---|
| WO | 2019/059812 A1 | 3/2019 |
| WO | 2020/097115 A1 | 5/2020 |

OTHER PUBLICATIONS

U Joseph Poon and Vitalik Buterin, Plasma: Scalable Autonomus Smart Contracts, Aug. 11, 2017, https://www.plasma.io/ plasma-deprecated.pdf (Year: 2017).

(Continued)

*Primary Examiner* — Ghazal B Shehni
(74) *Attorney, Agent, or Firm* — Akerman LLP; Peter A. Chiabotti

(57) ABSTRACT

A system and method for utilizing permissioned data is disclosed. A user may grant permission to share certain data over a platform. A third party may seek targeted attributes and match the targeted attributes with the shared attributes of a user. A user may agree to accept communications directly from the third party.

15 Claims, 23 Drawing Sheets

(56) References Cited

OTHER PUBLICATIONS

Matti Parssinen et al., "Is Blockchain Ready to Revolutionize Online Advertising?", IEEE Access, vol. 6, Oct. 19, 2018.
Max Ritillner et al., "Applications of Blockchain Technology a Review of Existing Use Cases Relevant to Online Advertising," Jul. 14, 2017.

* cited by examiner

HOW MUCH DO YOU EXPECT TO SPEND ON CHRISTMAS PRESENTS THIS YEAR?

○ NOTHING

○ LESS THAN £100

○ £101 - £250

○ £251 - £500

○ £501 - £1000

○ £1001 - £2000

○ MORE THAN £2000

○ NOT SURE/OTHER

FIG. 20

PERMISSIONS-BASED COMMUNICATION OF INFORMATION

FIELD OF THE INVENTION

The present application relates to web service technologies, blockchain technologies, data aggregation, manipulation, and analysis technologies, tracking technologies, and computing technologies, and more particularly, to a system and method that facilitates permissions-based communication of information.

BACKGROUND

In today's technologically driven society, individuals and organizations create data on a daily basis. Data may be created by way of interacting with a digital device such as a computer or mobile phone. For example, an individual or organization may create data by browsing the internet, interacting on social media networks, uploading personal files, syncing devices, shopping online, location tracking of a mobile device, health information, and driving a car. This data is typically transmitted to large corporations, where it may be stored, analyzed, sold, tampered with, extracted or otherwise exploited. The originator of the data mostly loses control over its data when signing up for digital services and in many instances is not aware of the data being shared or mined from a user or organization.

The digital advertising market currently uses mined data in an attempt to target advertising. However, the digital advertising market is inefficient and lacks transparency. The result is frustration for market participants, for the 'sellers' of personal data (individuals), the 'buyers' of personal data (advertisers), and the web publishers where personal data transactions take place in the form of online advertising. The current mechanisms for identifying us, tracking us, and reaching us are intensively personal and pervasive and makes us uncomfortable. Internet users are increasingly trying to avoid being tracked and identified. A fast-growing proportion of people are deliberately rebelling against being tracked on principle and in practice.

In addition, while certain technologies exist today to utilize mined data for digital advertising, such technologies and processes have many shortcomings. For example, an advertiser may attempt to infer the interests of a user based on internet searches or online shopping data, and provide an inferred targeted advertisement to user. However, the process of inferring information about a user or organization is inefficient, often incorrect, and may result in ineffective ad targeting. Such ineffective ad targeting has a negative impact on brands and publishers. In addition, current technologies and processes technologies and processes are often error-prone, provide a lot of irrelevant information, and may be difficult to implement. For example, brands cannot be certain their ads are being viewed by real people. Organizations exist that sell bot services to imitate human traffic, for example to provide "clicks" on digital advertisements, "likes" on Facebook, "views" on YouTube, or other misleading interactions with an advertisement or brand. Such interactions are ineffective from an advertising perspective because a human is not viewing the advertisement or interacting with the brand, yet metrics indicate a broad exposure. In addition, even when a human may be on the receiving end of an advertisement, a proliferation of ad blockers indicates increasing consumer dissatisfaction with the online ad experience, while brands and publishers face revenue losses due to ineffective targeting.

Furthermore, the European Union's General Data Protection Regulation (GDPR) is intended to increase consumer data protection and threatens to levy hefty fines against businesses failing to comply. Thus, it may be advantageous to provide a digital advertising platform that allows verification of the data exchange between consumers and advertisers. As a result, there is a need for improved technologies and processes to obtain data from individuals and organizations, share such data, and utilize the data in an expeditious and effective manner. Such enhancements and improvements may provide for improved user satisfaction, improved advertiser satisfaction, improved effectiveness, increased efficiencies, increased access to meaningful data, substantially improved decision-making abilities, and increased ease-of-use for users, while simultaneously optimizing the use of computing resources.

SUMMARY

The present invention is directed to a digital advertising platform and method. In an embodiment of the invention, users provide permission to share certain data attributes with a platform. For example, a user may provide permission to share certain data attributes from a mobile device, such as a mobile phone, through a phone application. A user may choose which data attributes are made available to the platform. A user may choose to allow certain data to be shared with the platform and not share other data. Data may be shared pursuant to blockchain. The user's data may be matched with advertisers that identify target consumer attributes. A targeted advertisement may then be sent to the user based upon the shared data. In exchange for sharing their data, consumers earn rewards. Advertisers using the platform gain access to known audience attributes, which enables more effective ad targeting and better campaign performance.

The blockchain-based platform allows users will be able to choose which personal attributes to make available to advertisers while remaining anonymous. For example, a user might decide to share information about favorite hobbies and withhold data related to health history. In an embodiment, a user sharing data may remain anonymous. In exchange for sharing attributes, users may earn additional rewards. Advertisers may obtain access to personalized, permissioned data that can be leveraged for more effective ad targeting. The transparent and verifiable record of transactions will provide assurance that ads are reaching actual humans as opposed to bots and support businesses in meeting GDPR requirements. In an embodiment, the data tracking capabilities of blockchain provides an improved digital advertising environment for consumers, advertisers, and publishers.

In one embodiment, a system for utilizing permissioned data is disclosed. The system may include a memory that stores instruction and a processor that executes the instructions to perform operations conducted by the system. The system may receive, from a first communication device, data permissions and attributes corresponding to a first user. The system may receive, from a second communication device, target attributes corresponding to a second user. The system may determine based on data permissions and attributes corresponding to a first user and the target attributes corresponding to a second user, a possible match of said first user with said second user. The system may provide to the first communication device, a communication from said second user.

In another embodiment, a method for utilizing permissioned data is disclosed. The method may include receiving, from a first communication device, data permissions and attributes corresponding to a first user; receiving, from a second communication device, target attributes corresponding to a second user; determining, based on data permissions and attributes corresponding to a first user and the target attributes corresponding to a second user, a possible match of said first user with said second user; and, providing, to the first communication device, a communication from said second user.

In another embodiment, a computer-readable device having instructions for utilizing permissioned data is provided. The computer instructions, which when loaded and executed by a processor, cause the processor to perform operations of receiving, from a first communication device, data permissions and attributes corresponding to a first user; receiving, from a second communication device, target attributes corresponding to a second user; determining, based on data permissions and attributes corresponding to a first user and the target attributes corresponding to a second user, a possible match of said first user with said second user; and, providing, to the first communication device, a communication from said second user.

Another embodiment of the present invention is directed to a method of providing a permission-based advertising platform. The method includes granting permission to share certain data attributes and sharing permissioned attributes with a platform. The method further includes matching the shared data attributes with target attributes. The method further includes providing a targeted advertisement to the user based upon the matched attributes. The method further includes providing a reward to the user for sharing data.

These and other features of the systems and methods utilizing preferences to curate venues based on data obtained from a variety of sources are described in the following detailed description, drawings, and appended claims.

BRIEF DESCRIPTION OF THE DRAWINGS

Figure 14:
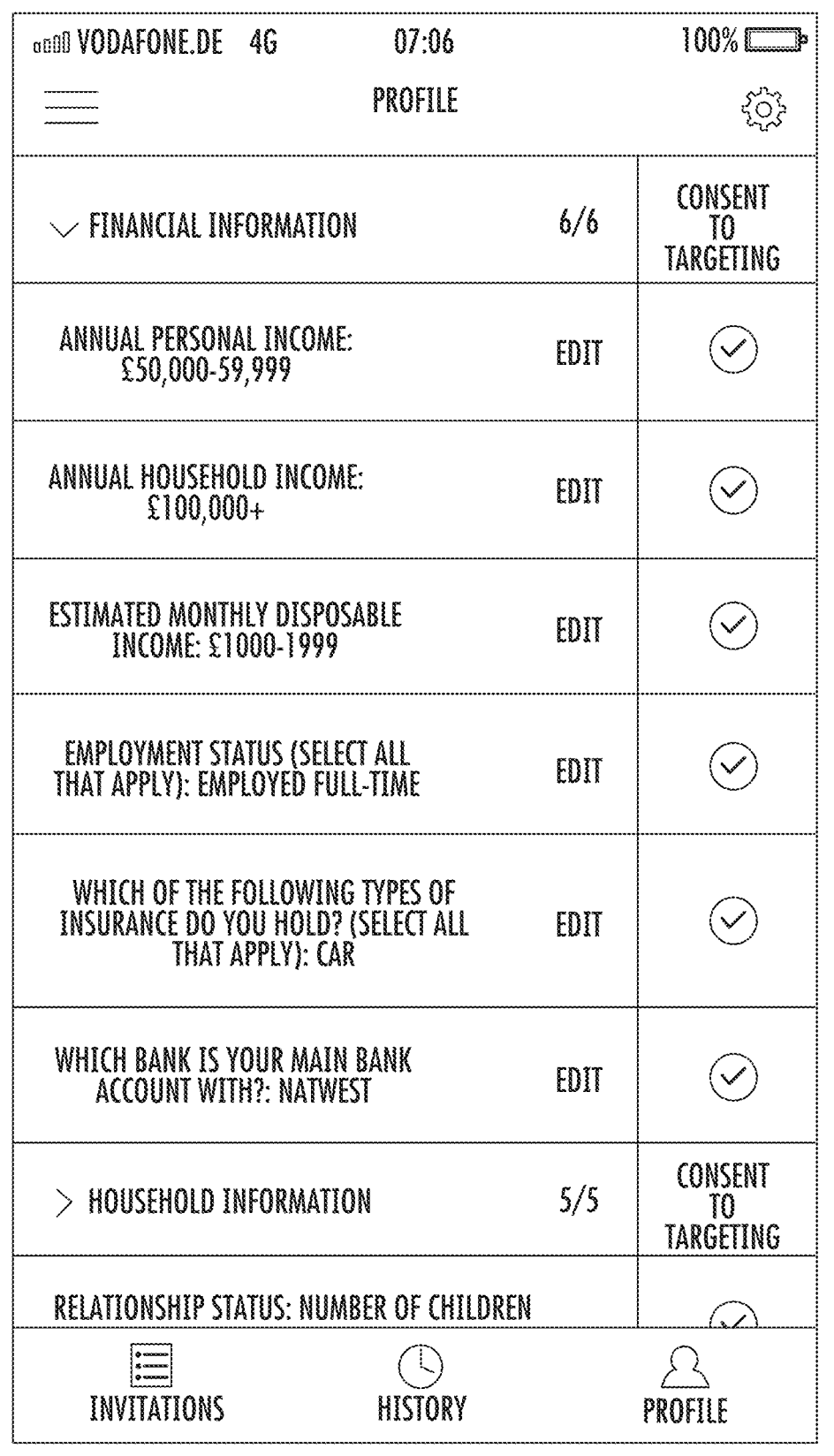

FIG. 14 is a screen shot from a mobile phone of a user illustrating example profile and consent information.

FIG. 18 is a screen shot from a mobile phone of a user illustrating an example question when a user accepts an invitation.

FIG. 20 is a screen shot from a mobile phone of a user illustrating an example question when a user accepts an invitation.

DETAILED DESCRIPTION OF THE INVENTION

Figure 1:
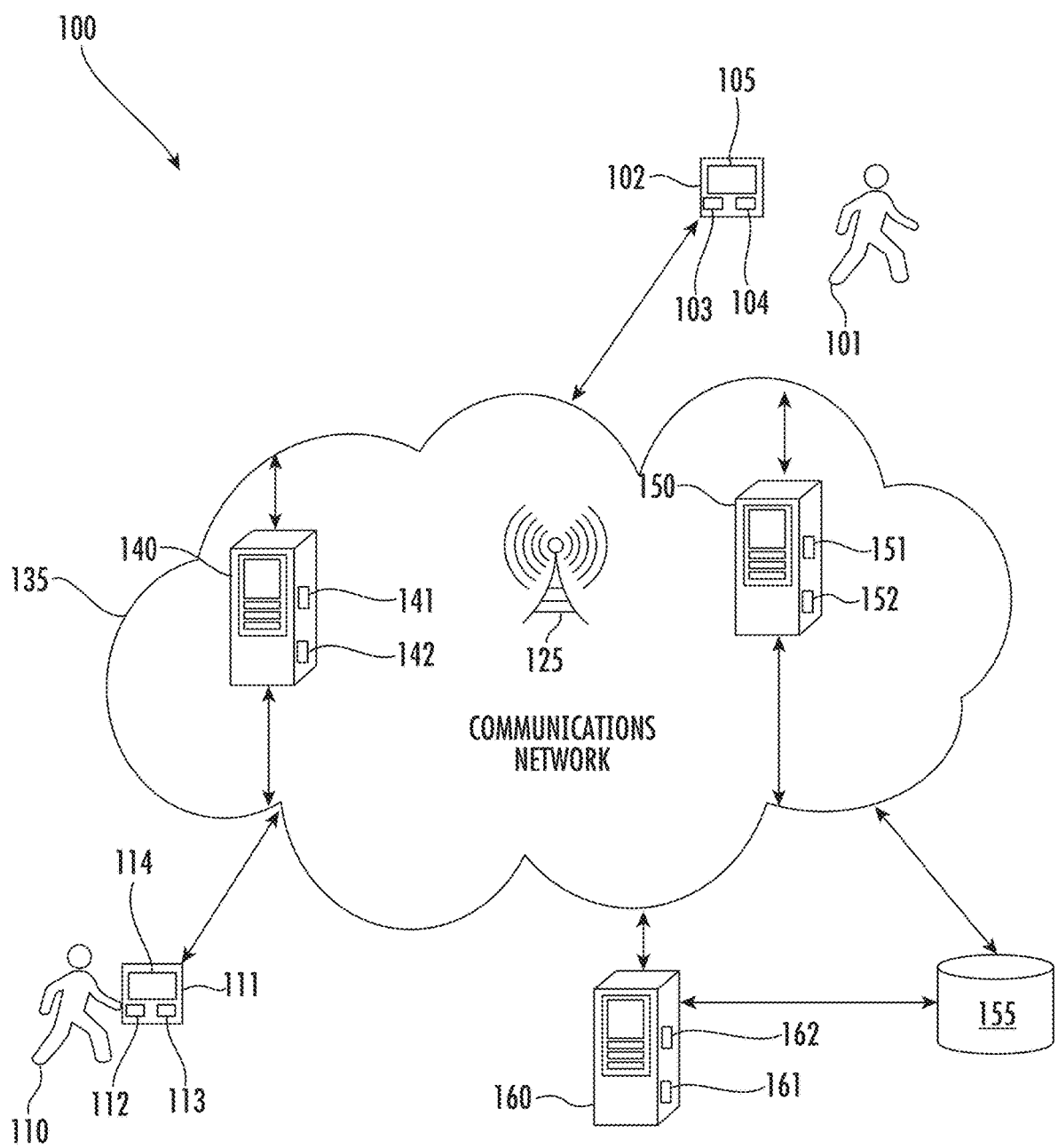
FIG. 1 is a schematic diagram of a system for utilizing permissioned data.
Figure 2:
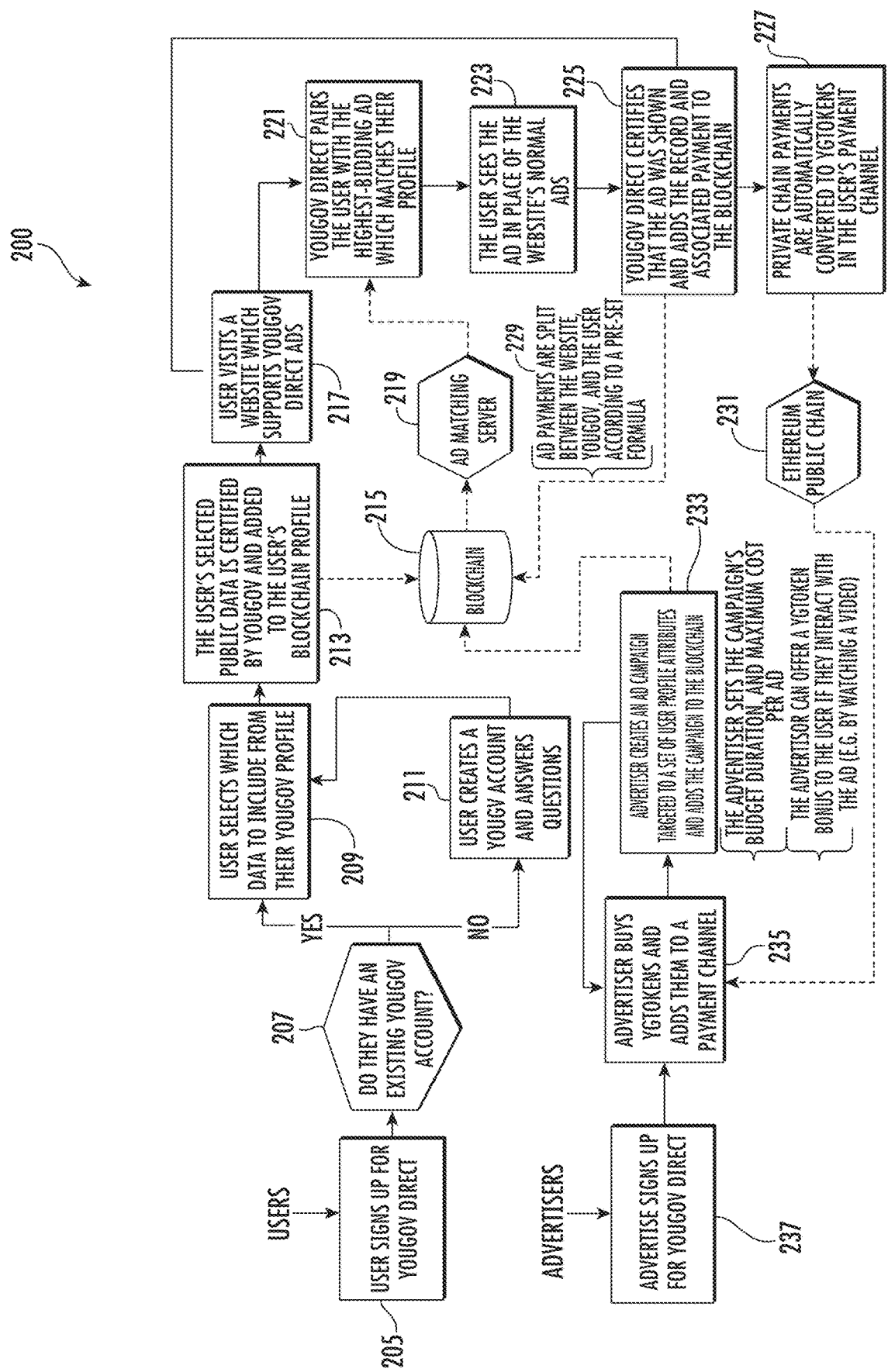
FIG. 2 is a diagram illustrating a sample method and flow diagram for utilizing permissioned data that may be used with the system of FIG. 1.
Figure 3:
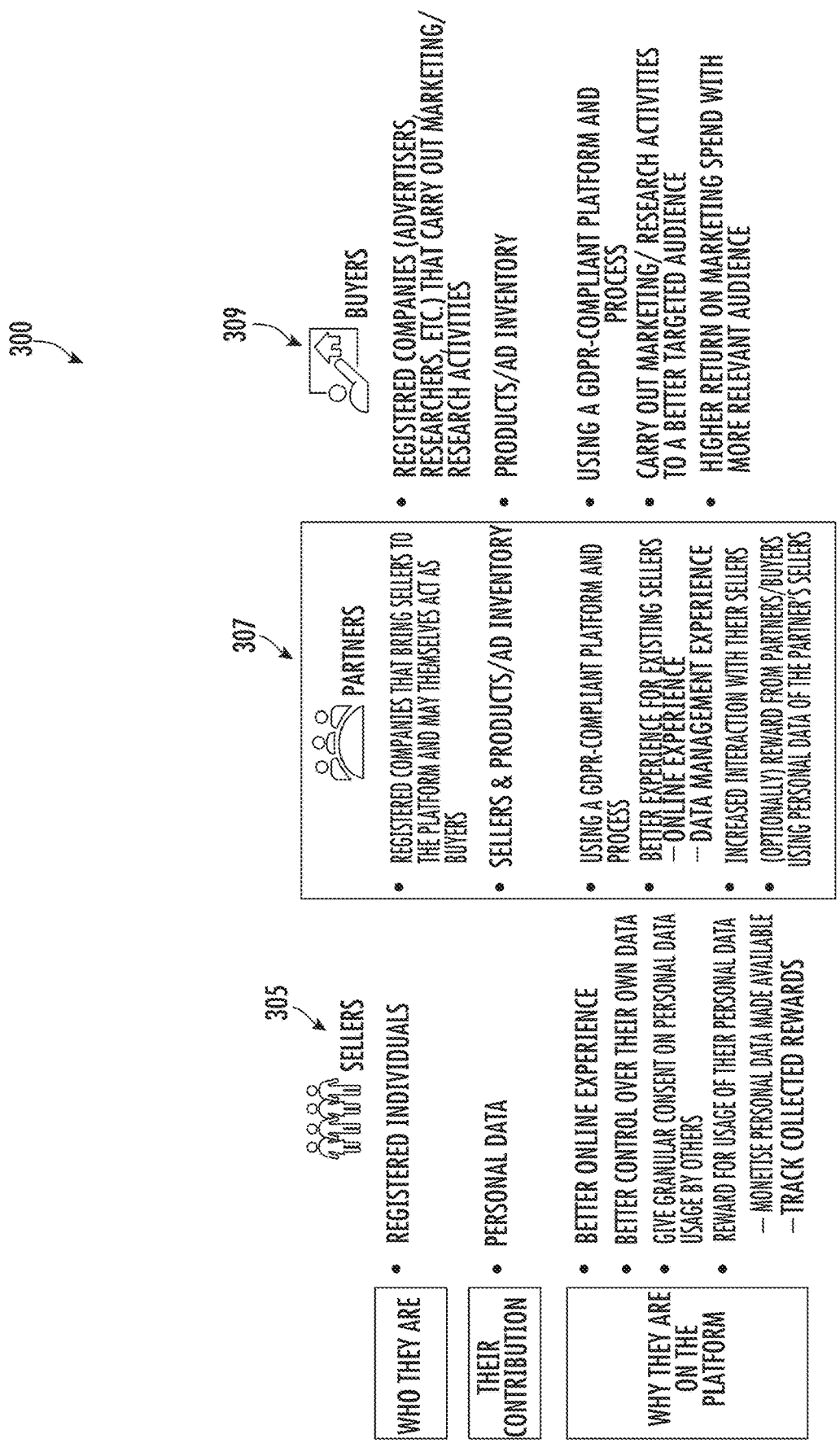
FIG. 3 is a diagram illustrating the potential users of the system of FIG. 1.
Figure 4:
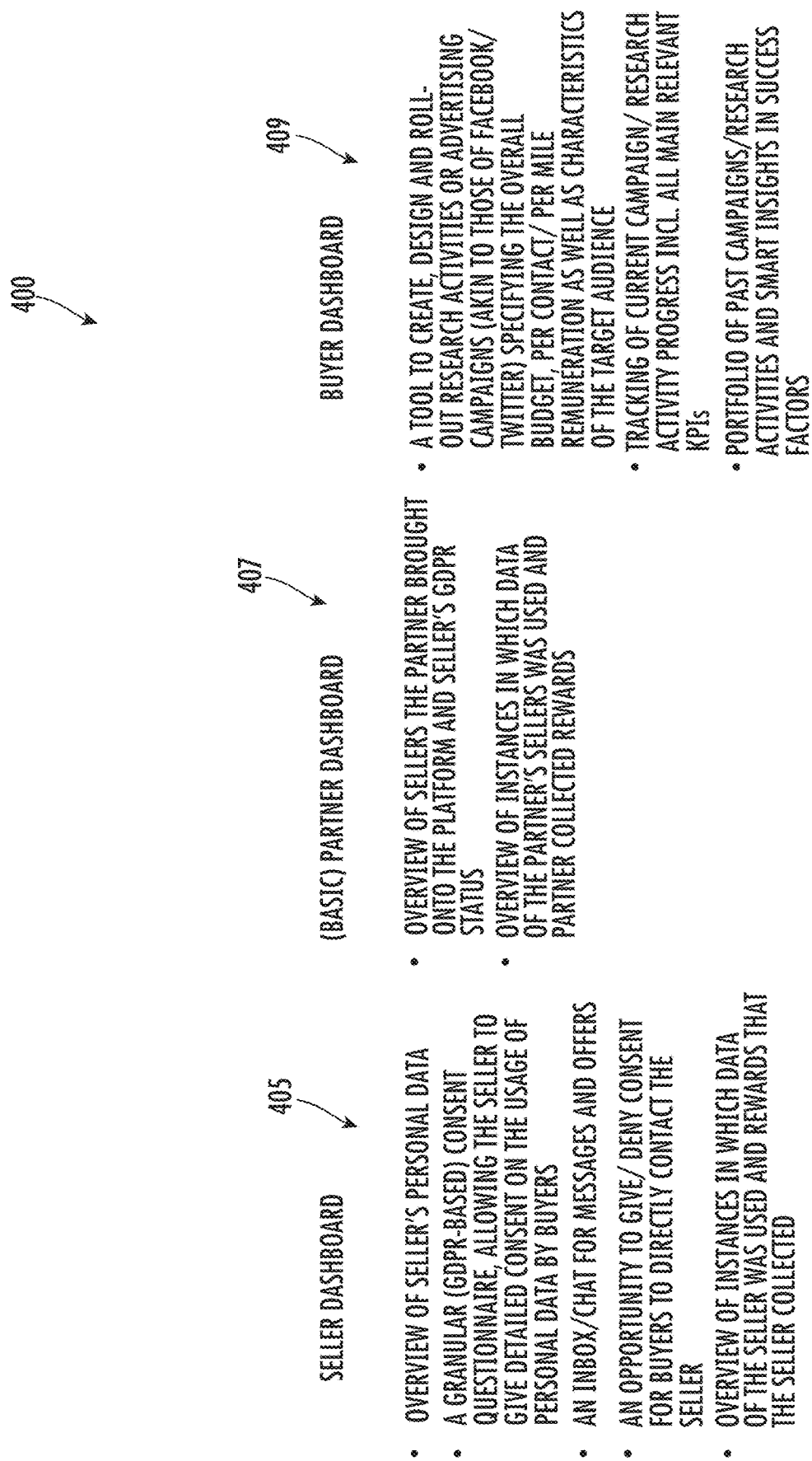
FIG. 4 is a diagram illustrating the attributes of the dashboards that may be used with the system of FIG. 1.
Figure 5:
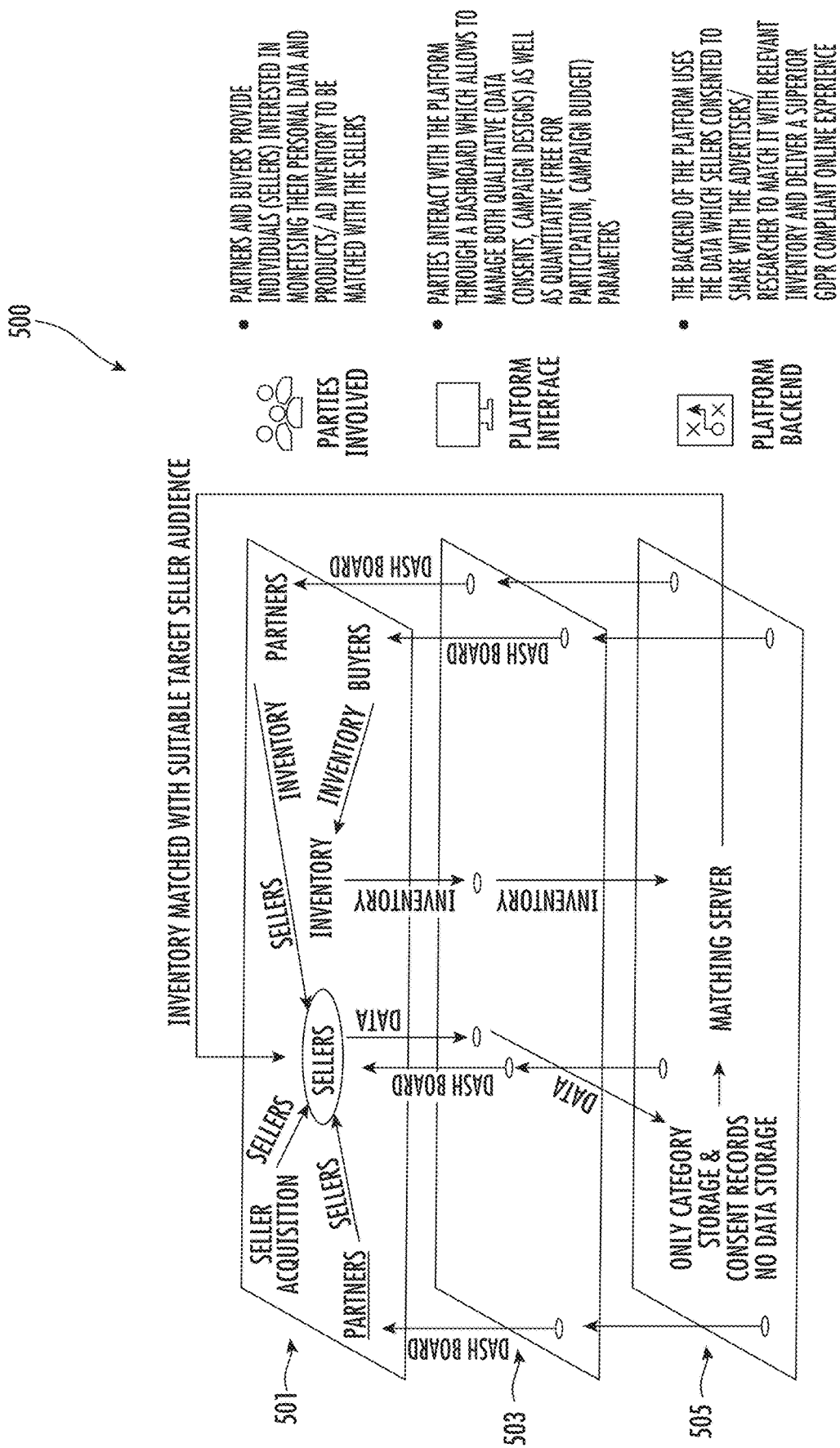
FIG. 5 is a diagram illustrating a sample method and flow diagram for utilizing permissioned data that may be used with the system of FIG. 1.
Figure 6:
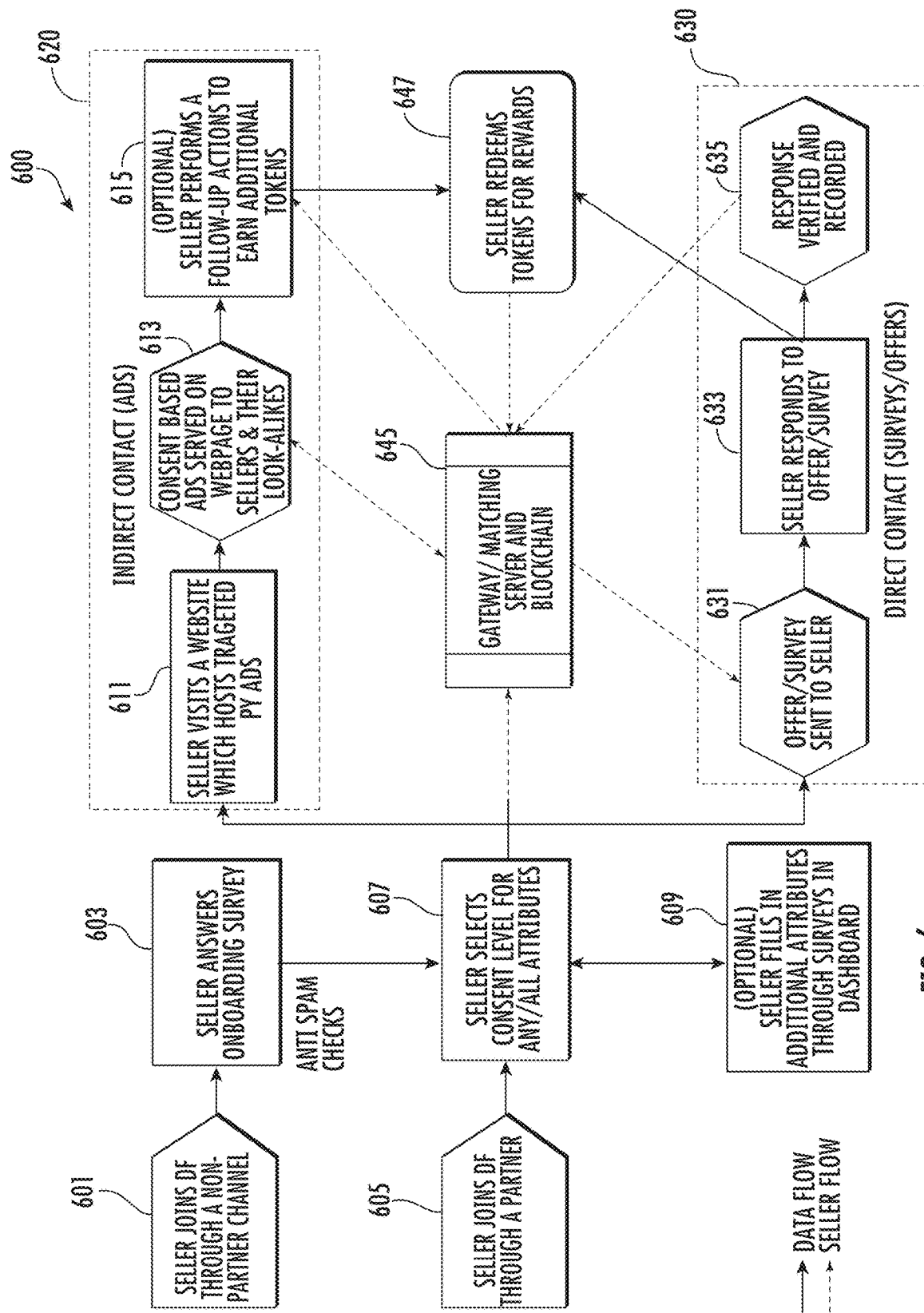
FIG. 6 is a diagram illustrating a sample method and flow diagram for utilizing permissioned data that may be used with the system of FIG. 1.
Figure 7:
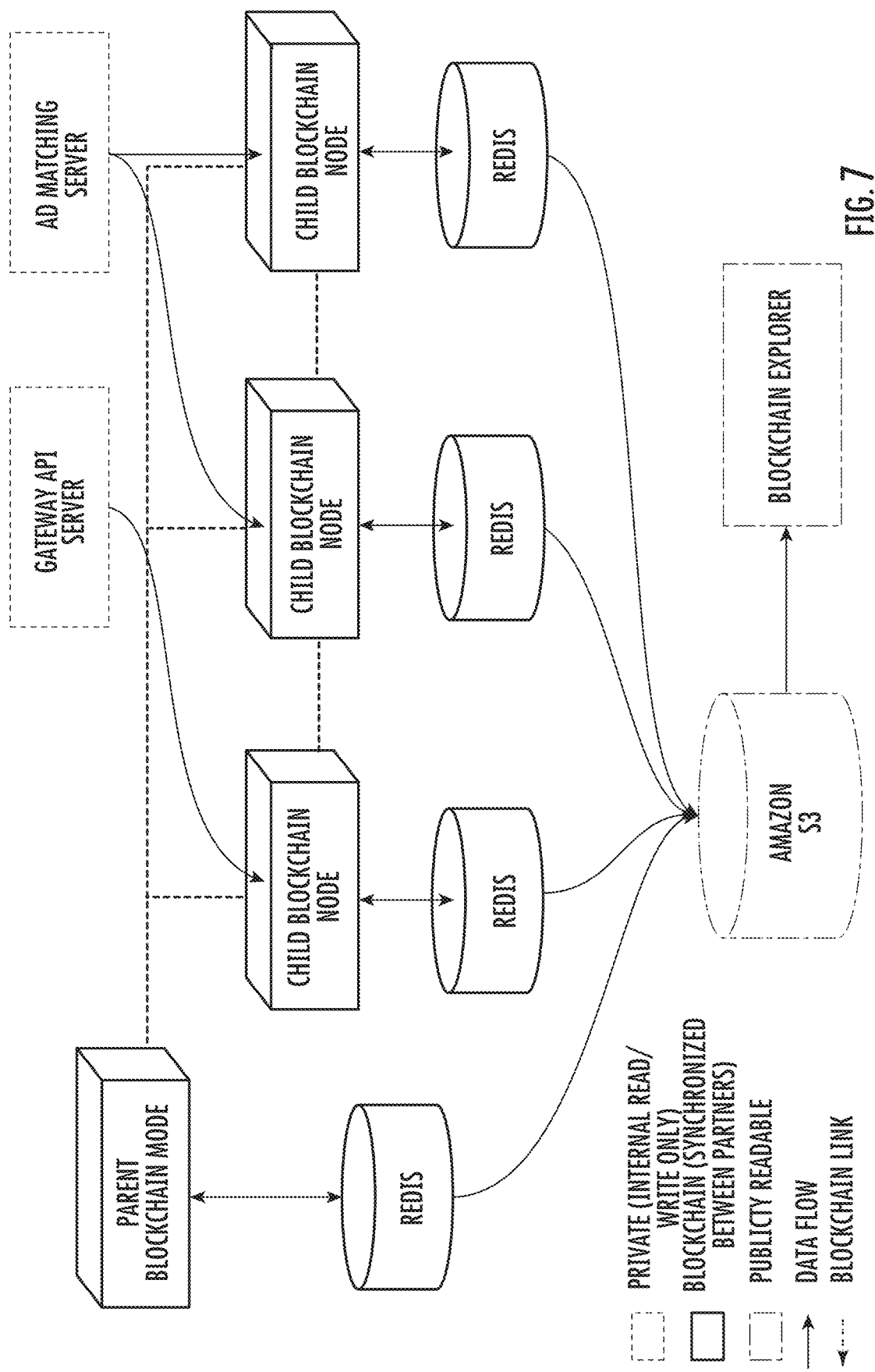
FIG. 7 is a schematic diagram of a system for utilizing permissioned data that may be used with the system of FIG. 1.
Figure 8:
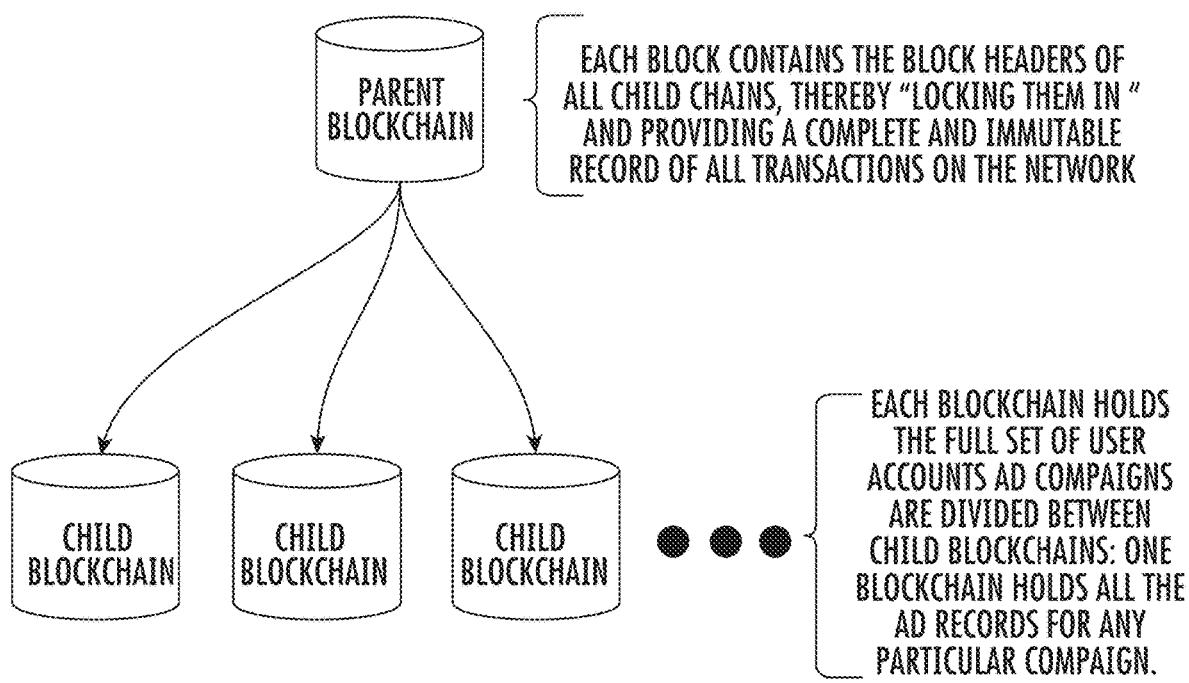
FIG. 8 is a schematic diagram of a system for utilizing permissioned data that may be used with the system of FIG. 1.

A system 100 and method for utilizing shared permissioned data to curate digital advertisements based on data obtained from a variety of sources, including the shared permissioned data. In particular, the system 100 and accompanying methods provide for a web service that collects and curates data information from users or organizations. The data may include information browsing the internet, interacting on social media networks, uploading personal files, syncing devices, shopping online, location tracking of a mobile device, health information, or driving a car, or any combination thereof. Additionally, the system 100 and accompanying methods provide a novel way for searching for allowing a user or organization to control the types of data that is shared and provide permission to receive targeted advertisements based on the shared data. To that end, the system 100 and methods may utilize a website, an application, or other software program that allows for the display of the types of data that the user agrees to share, and the user may also share data through surveys. The data may be anonymous and aggregated, and will be able to designate which attributes to make available to marketers. In return, panelists will receive tokens from advertisers for viewing and interacting with curated ads that replace the ads a user would otherwise see online. Advertisers will know their ads are viewed by real willing customers. Advertisers can buy tokens on a designated exchange. Panelists receiving tokens can sell them on an exchange or use them in a third-party loyalty program to purchase products and services, receive discounts or participate in other special offers. In an embodiment, the platform is decentralized where participants are known to be unique, human, and possessing certain attributes as stated directly by the participants, rather than inferred. Buyers may approach sellers based on actively provided and consented personal data. The platform will allow advertisers to target participants based on attributes users have permissioned them to temporarily know. Users will be paid tokens by advertisers in exchange for this permissioned targeting. Users may remain anonymous, and the ads they see will replace ads they would otherwise see when online. A user may have transparency about who is targeting them, what data they are collecting, and what they are doing with the data.

Also, the system 100 and methods may include allowing users to store, organize, and sell their data though a secure platform that will make a sale on an individualized process. Users can manage their online personal data and for example, see the data, see how third parties request to use the data, and grant I deny consent to those third parties and specify a minimum price for use. For example, a user may allow sale of data through a single broker on behalf of the user, or a user may want to manage the sale of data directly to a buyer, with varying degrees of control between. Users can utilize the platform to store and control their data and gain additional value for their data. Data consumers, for example advertisers, will pay a rate dependent on the value of the data to them. For example, corporations, academic institutions and others seeking to access personal data legally and with consent of individuals can do so by making individual direct contact with bespoke offers, target ads to groups or individuals, reach targeted audiences for surveys, academic research or other purposes. In general, the more personal the data and the more personal the usage, the greater value it will have. For example, a member may receive a higher payment if their medical records are used to market directly to them than if, their laundry detergent preferences are not useable for any kind of contact by are only added to a data set used to model out a campaign to the whole population. Advertisers that want to understand and market to their target groups or general audiences will have access to explicitly permissioned, curated, and valuable data allowing them to work with their current ad-serving partners to provide a more granular and connected dataset that is aligned with GDPR, Eprivacy and the associated attitudes in society that are driving those regulations. Advertisers will also be able to make direct contact with anonymized individuals who have been highly qualified by permissioned data, either for research purposes, including ad-testing with post-view tracking, one-to-one or small-group, conversations, conventional surveys, or for direct marketing.

As shown in FIGS. 1-23, a system 100 for utilizing shared permissioned data to curate digital advertisements based on data obtained from a variety of sources, including the shared permissioned data. The system 100 may be configured to support, but is not limited to supporting, data and content services, computing applications and services, cloud computing services, internet services, satellite services, telephone services, software as a service (SaaS) applications, mobile applications and services, and any other computing applications and services. The system may include a first user 101, who may utilize a first user device 102 to access data, content, and applications, or to perform a variety of other tasks and functions. As an example, the first user 101 may utilize first user device 102 to access an application (e.g., a browser or a mobile application) executing on the first user device 102 that may be utilized to access web pages, data, and content associated with the system 100. In certain embodiments, the first user 101 may be any type of user or organization that generates data. For example, the first user 101 may be an individual that browsing the internet, interacting on social media networks, uploading personal files, syncing devices, shopping online, location tracking of a mobile device, generating health information, or driving a car, or any combination thereof. The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g., screen, monitor, graphical user interface, etc.) that may enable the first user 101 to interact with various applications executing on the first user device 102, to interact with various applications executing within the system 100, and to interact with the system 100. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1. The first user device 102 may also include a global positioning system (GPS), which may include a GPS receiver and any other necessary components for enabling GPS functionality.

In addition to the first user 101, the system 100 may include a second user 110, who may utilize a second user device 111 to access data, content, and applications, or to perform a variety of other tasks and functions. The second user 110 may also be any type of user or organization that generates data. For example, the first user 101 may be an individual browsing the internet, interacting on social media networks, uploading personal files, syncing devices, shopping online, location tracking of a mobile device, generating health information, or driving a car, or any combination thereof.

Much like the first user 101, the second user 110 may utilize second user device 111 to access an application (e.g., a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g., a screen, a monitor, a graphical user interface, etc.) that may enable the second user 110 to interact with various applications executing on the second user device 111, to interact with various applications executing in the system 100, and to interact with the system 100. In certain embodiments, the second user device 111 may be a computer, a laptop, a tablet device, a phablet, a server, a mobile device, a smartphone, a smart watch, and/or any other type of computing device. Illustratively, the second user device 111 may be a computing device in FIG. 1.

In certain embodiments, the first user device 102 and the second user device 111 may have any number of software applications and/or application services stored and/or accessible thereon. For example, the first and second user devices 102, 111 may include cloud-based applications, location-determining applications, GPS applications, database applications, algorithmic applications, phone-based applications, product-ordering applications, business applications, e-commerce applications, media streaming applications, content-based applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for determining locations of users and devices, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first and second user devices 102, 111 may include associated telephone numbers, internet protocol addresses, device identities, or any other identifiers to uniquely identify the first and second user devices 102, 111. In certain embodiments, location information corresponding to the first and second user devices 102, 111 may be obtained based on the internet protocol addresses.

The system 100 may also include one or more cell towers 125, which may include any number of antennae to facilitate communications for the devices, applications, and networks in the system 100. The cell tower 125 may be utilized to create a cell for the communications network 135. Each cell tower 125 may include an identifier that is utilized to identify the cell tower 125 to any of the networks, devices, and programs in the system 100. The identifier may be a sequence of numbers, characters, or any combination thereof that uniquely identify the cell tower 125. In certain embodiments, the cell tower 125 may be a base station or other similar station, and may include any of the functionality and features of any type of cell site or tower. In certain embodiments, the cell tower 125 may be utilized to facilitate communications for the first and second user devices 102, 111, the locations 115-117, the servers 140, 150, 160, the database 155, any other components of the system 100 or outside the system 100, or any combination thereof.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, any network, or any combination thereof. Illustratively, cell tower 125, server 140, and server 150 are shown as being included within communications network 135.

The functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140, and 150 may be utilized to perform the various operations and functions provided by the system 100, such as those requested by applications executing on the first and second user devices 102, 111. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 100, any other device, any network, or any combination thereof.

The database 155 may also store information obtained from the system 100, store information associated with the first and second users 101, 110, store location information for the first and second user devices 102, 111 and/or first and second users 101, 110, store location information for the locations 115-117, store user profiles associated with the first and second users 101, 110, store device profiles associated with any device in the system 100, store communications traversing the system 100, store user preferences, store demographic information for the first and second users 101, 110 and/or the locations 115-117, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The database 155 may store algorithms for calculating gender ratios, ethnicity distributions, averaging age ranges, averaging demographic information received for a particular locality from various users checked into the locality, any other algorithms for performing any other calculations in the system 100, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

The system 100 may also include one or more software applications, which may be configured to perform and support the operative functions of the system 100. In certain embodiments, the application may be a website, a mobile application, a software application, or a combination thereof that may be made accessible to users utilizing one or more computing devices, such as first user device 102. The application may be utilized to sign up for an account, provide permissions, and manage interactions with the system 100. A may select from a menu which of their existing attributes they are willing to be used by third parties. The application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom graphical user interface that the first user 101 or second user 110 may interact with by utilizing the web browser executing on the first user device 102 or second user device 111.

When users sign up for an account, a number of steps may be taken to ensure panelists are human and maintain only one account. For example, the administrator may use recaptcha and assess various aspects of the user's profile. A user that passes the first opt-in stage is then sent a second opt-in verification link; without confirming the link the user cannot proceed as a panelist. During the user's first survey interaction the administrator may check to ensure that the respondent is a human, and presents a unique digital signature. In addition, a machine learning application that scans relationships between accounts may be used to help determine whether a user has attempted to create an additional account.

The system and method of FIGS. 1-23 allow direct ad serving based on profiling data. Panelists may accept direct payment from third parties in return for access to someone with their attributes. For instance, Jenny (using a pseudonym) can select to make 'available' that she is 36 years old, lives in Vermont, and enjoys cycling, while keeping unavailable that she works as a lawyer and is planning a trip to Hawaii. An advertiser looking to reach people with Jenny's available attributes will pay Jenny in tokens in exchange for the right to serve her an ad, which would replace the ad she would otherwise see when browsing. Panelists will benefit from better targeted online ads. Advertisers will benefit in that through the platform they can directly reach real people that have verified attributes.

In an embodiment, the system and method of FIGS. 1-23 utilize blockchain. A user id, payment in tokens, ad campaign id, and ad campaign desired attributes may be published to the blockchain for a transaction. The use of blockchain as a distributed ledger is beneficial to regulators, panelists and advertisers. For example, for regulators, the blockchain allows time-limited per use authorization on the part of individuals for use of their personal data. The use of the personal data and transactions are transparent. For panelists, transaction data on the blockchain will allow participants to verify with certainty which of their attributes are of value to third parties and what share of the ad spend they are receiving. For advertisers, transaction data on a blockchain will allow advertisers to verify with certainty who or what verified the authenticity of each viewer and their attributes, and what percentage of ad spend is going to viewers.

Addresses on the blockchain generally corresponded to a user account, ad campaign, or basic account. After a user joins and selects their data preferences, the platform creates a blockchain address for the user containing the high-level demographic attributes most important to advertisers (age, gender, and broad location, possibly among others). To maintain privacy, the blockchain profile is limited to these high-level demographics, with other attributes stored off the blockchain. Account addresses are anonymous; only the user and administrator know which blockchain address is associated with that particular user. Advertisers wishing to serve ads through the platform create a smart contract for their ad campaign through the web portal. The smart contract consists of the maximum allowed cost per ad, the set of targeted user attributes, and a start and end time. The campaign's total budget is equal to the token balance sent to the smart contract. Advertisers can end their campaign and retrieve any unused tokens by transferring the tokens to another blockchain address. Advertisers and other platform participants may store their tokens in a basic account when the tokens are not currently pledged to an ad campaign. Basic accounts do not have special attributes.

When a user views an ad, the administrator sends a certified record of the ad to the campaign's smart contract. This record consists of the user's blockchain address and the ad's price in tokens. The smart contract enforces that every ad served conforms to the parameters defined in the ad campaign: the ads must be served between the start and end time at a price no greater than the maximum specified for the campaign, and the user's blockchain profile must contain the required attributes. Advertisers may optionally target more specific attributes which are not part of the user's blockchain profile. For instance, a sports shoe manufacturer may wish to target users who included in their profile that have a current gym membership. To preserve user privacy and anonymity, the administrator does not store these more detailed attributes as part of the user's blockchain address. For these types of smart contracts, the administrator certifies that each user served an ad possesses the attributes without revealing their blockchain address or any other information about the user. The smart contract then directs the user's share of the ad payment to an anonymous single-use address controlled by the user. These single-use addresses can be anonymously converted to tokens on the public Ethereum blockchain by bundling them into the user's payment channel.

The administrator utilizes payment channels for token transfers to and from the Ethereum public chain. When a user begins receiving tokens from ads, the administrator stakes tokens into a payment channel with that user. As the user collects more tokens on the platform, they can automatically transfer these to their channel. The administrator will update the payment channel to reflect the increased balance. The user may close the payment channel at any time to retrieve their tokens. Advertisers may also create a payment channel with the administrator. This allows them to transfer tokens to the platform as needed, without storing a large balance of tokens on the platform. All participants have the option of creating and managing their own private keys for both the administrator platform and the Ethereum public chain. Alternatively, they can allow the administrator to manage one or both sets of keys for them through a wallet program. The wallet can automatically open and close payment channels, continuously update the payment channel off-chain as the user receives additional tokens, and sign transactions for the user's accounts.

An ad campaign is assigned to one child blockchain. The child blockchain holds a complete record of ads served and payments made for that campaign. The child blockchain also holds the full set of user addresses. This allows an ad campaign to reach the full set of users even though it exists on a single child blockchain. The parent blockchain includes the block headers of all child chains, thereby providing a record of all transactions on the network. The child blockchains hold the set of user accounts. Ad campaigns are dived between child blockchains such that one blockchain holds all the ad records for a particular campaign. A user's attributes may be verified by a distributed ledger. A targeted ad is an individual transaction on the blockchain.

The system and method of FIGS. 1-23 is scalable and may be composed of parent blockchain and child blockchains running in parallel. The parent blockchain may be coordinating block production by the child chains. In an embodiment, the creation of a new child chain with every fix set of new sellers allows parallel scalability. In an embodiment, the limiting factor may be the speed at which new child block hashes are processed and notification of new block starts can be done. The system and method of FIGS. 1-23 is flexible in that the API allows submission of transactions by approved parties. The modification of requirements by other partners is possible. The transaction models support consent and payments, indirect contacts and direct contacts. The system and method of FIGS. 1-23 provides for privacy in that the blockchain reports public part of transactions, consent is stored on the blockchain containing price, ad campaign and for example, up to three targeted categories (e.g., gender, age, location). The hashed signatures of consent are used to prevent further identification of sellers. Seller data is not typically stored on the blockchain. The system and method of FIGS. 1-23 is reliable/auditable. The blockchain server will add transactions with a unique reference (consisting of blockchain ID, block number and transaction index) to data store. The full signed blocks are uploaded to a publicly readable repository for third party review. In case of data loss, data can be reconstructed from public repository. The system and method of FIGS. 1-23 provides for security in that the endpoints are secured by 2-way SSL and parent blockchain nodes act as certificate authority responsible for issuing and managing certificates. The system and method of FIGS. 1-23 provides that data does not generally pass from a member to a third party, use of member data is individually and actively permissioned, third party does not track a member through this process, clients may contact members without middle-man interaction, the administrator of the platform sets the rules, certifies data, validates members and clients, interactions are simple, fast, contracted, accounted transaction, a secure place for members and clients to communicate and trade data. The system and method of FIGS. 1-23 can be used for conducting self-service research with granular respondent definitions, testing concepts, ads, offers, delivering targeted advertising, other communication or interactions.

The system and method of FIGS. 1-23 describes a process of permissioned use of data within safe direct contact and may be used in all forms of client-panelist interaction, whether for conducting surveys, other research or engagement tasks, or delivering ads. Individuals or organizations that register to use the platform can manage personal data consent, receive direct contacts from third parties for pay, view and manage balances from such payments, and view history of transactions. Companies that register to use the platform can collect personal data usage consent from their customers, allow customers ability to manage their personal data, including accepting payment for direct contact from their parties, which may be on the platform or by way of a publisher via an online ad, cell phone company via text message, or tv network via a TV ad. A member company may join the online ad platform. Third parties that are not registrants or members may be entities that desire to reach registrants directly based on registrant attributes. For example, direct advertisers, online advertisers, market researchers, or academic researchers.

The personal data management for registrants may be in the form of consent management. The consent management may be by data type, for example survey data, browser history, past purchases, health records, or other data type. The consent management may be by data use, for example direct contact of an offer or survey, online ad targeting, academic research. A registrant may grant consent by responding yes or no, or provide a price required for direct contact. A registrant may also have an inbox of third-party direct contacts, statement of asset balances, and history of transactions. With respect to members' customers, the data management may also include data pertaining to direct contact on members' platforms. A record of transactions can be referenced by businesses to verify they are meeting GDPR requirements. There is value and efficiency created for individuals in that they have a better experience of ads because they are more relevant due to the quality of data used for targeting, protection of privacy, and rewards for members for every permissioned use of their data. With respect to the direct contact interface for third parties, a third party may choose attributes of people it desires to reach, choose minimum payment to do so, which may be based on a base price and price per attribute, create a message to be delivered, and view a history of transactions. The publisher's ad platform for internet publishers Integrates data, data analysis software, demand side platform, supply side platform, matching engine, GDPR compliance. A publisher can deliver targeted advertising on publisher sites using GDPR compliant data.

In an embodiment, the platform and publisher may obtain permissions from members. The platform provides software to the publisher that combines data gathered by the publisher with known attributes provided by the platform to better understand publisher's visitors and improve visitor experience and ad targeting. Members who have received enhanced targeted ads can be post-tested by the platform to audit ad reach and ad effectiveness. The publisher can refer new members to the platform and receive royalty based on revenue the platform generates from referred members going forward.

Figure 9:
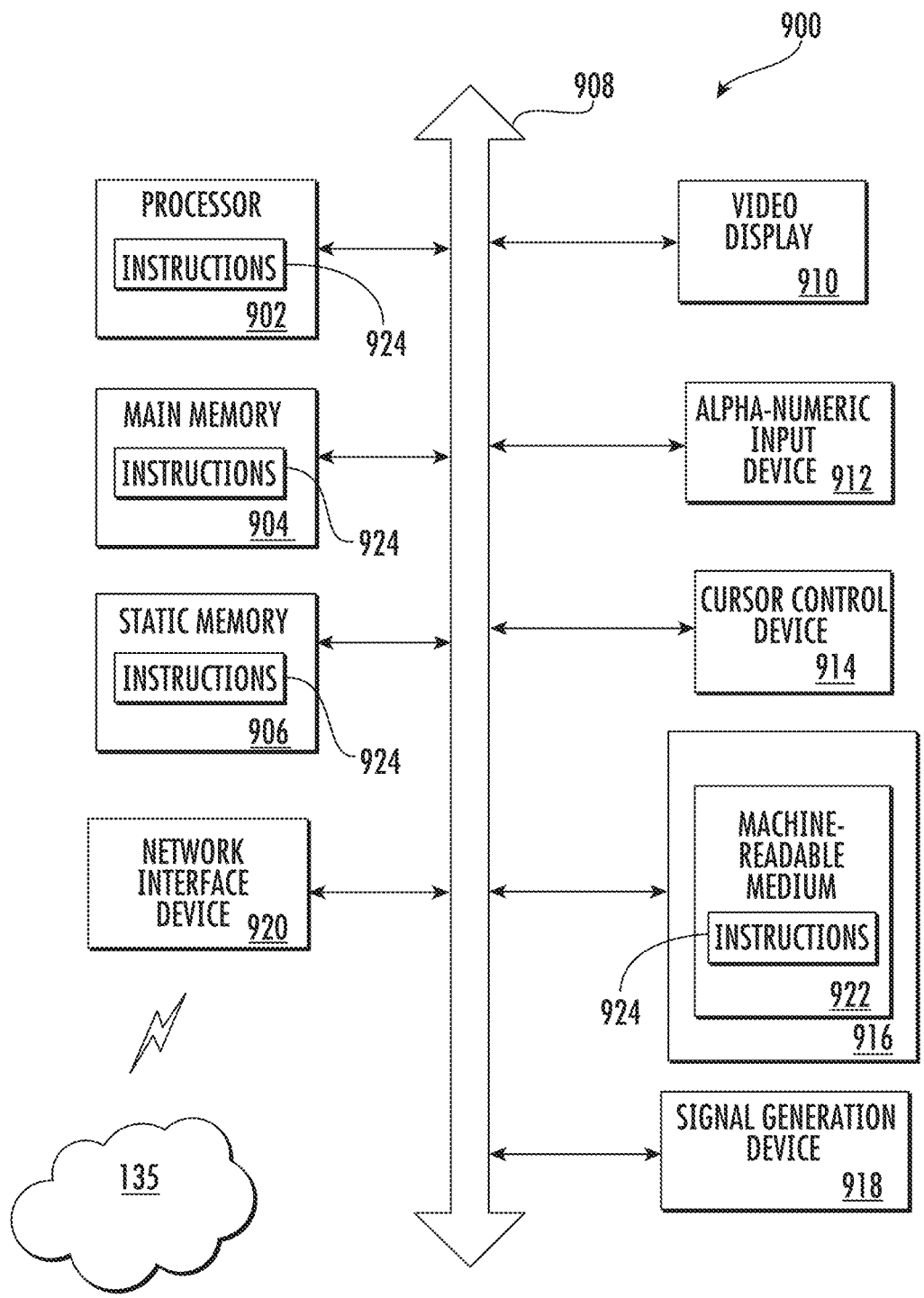
FIG. 9 is a schematic diagram of a machine in the form of a computer system within which a set of instructions, when executed, may cause the machine to perform any one or more of the methodologies or operations of the systems and methods for utilizing permissioned data.
Figure 10:
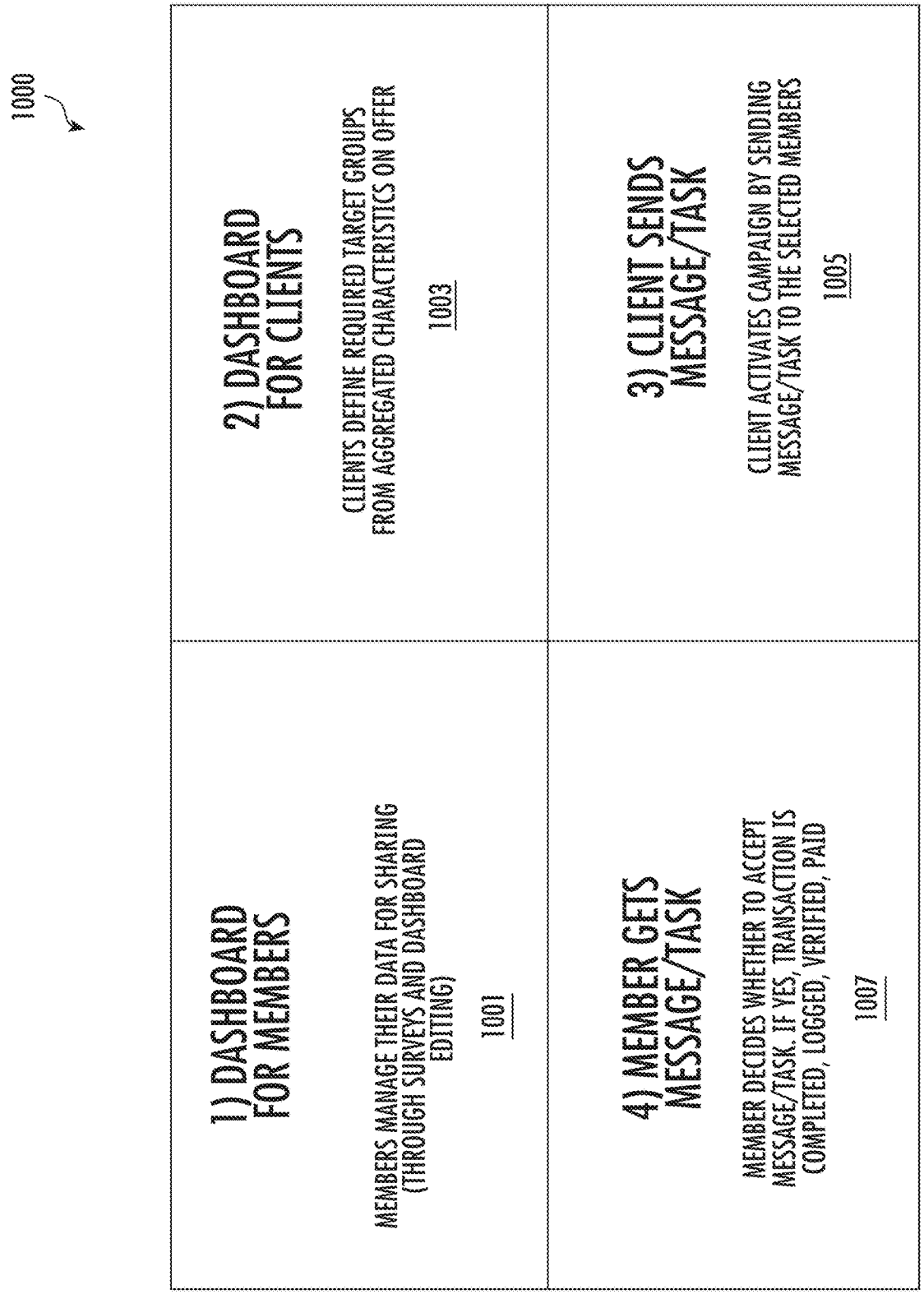
FIG. 10 is a diagram illustrating a sample method and flow diagram for utilizing permissioned data that may be used with the system of FIG. 1.
Figure 11:
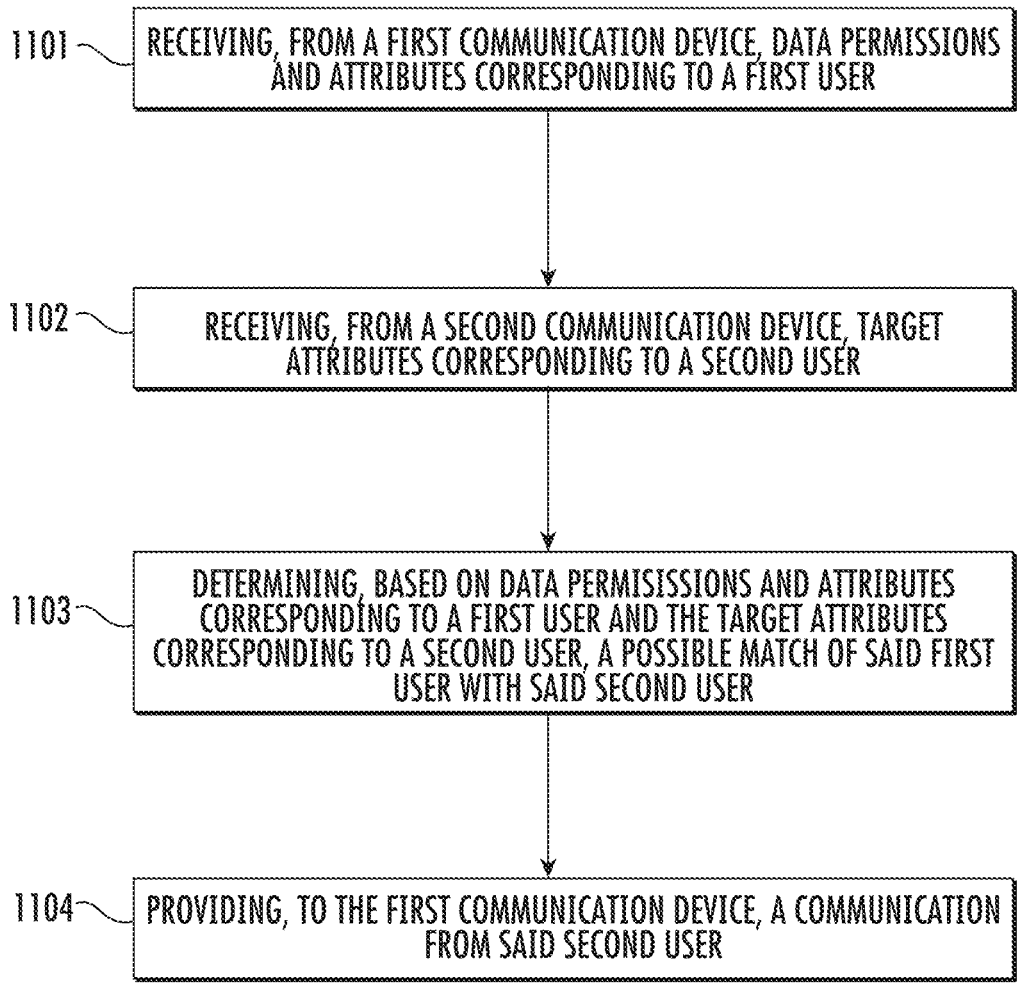
FIG. 11 is a method and flow diagram for utilizing permissioned data that may be used with the system of FIG. 1.

Referring now also to FIG. 9, at least a portion of the methodologies and techniques described with respect to the exemplary embodiments of the system 100 can incorporate a machine, such as, but not limited to, computer system 900, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the cell tower 125, the server 140, the server 150, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910, which may be, but is not limited to, a liquid crystal display (LCD), a flat panel, a solid-state display, or a cathode ray tube (CRT). The computer system 900 may include an input device 912, such as, but not limited to, a keyboard, a cursor control device 914, such as, but not limited to, a mouse, a disk drive unit 916, a signal generation device 918, such as, but not limited to, a speaker or remote control, and a network interface device 920.

The disk drive unit 916 may include a machine-readable medium 922 on which is stored one or more sets of instructions 924, such as, but not limited to, software embodying any one or more of the methodologies or functions described herein, including those methods illustrated above. The instructions 924 may also reside, completely or at least partially, within the main memory 904, the static memory 906, or within the processor 902, or a combination thereof, during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 922 containing instructions 924 so that a device connected to the communications network 135, another network, or a combination thereof, can send or receive voice, video or data, and communicate over the communications network 135, another network, or a combination thereof, using the instructions. The instructions 924 may further be transmitted or received over the communications network 135, another network, or a combination thereof, via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

Figure 12:
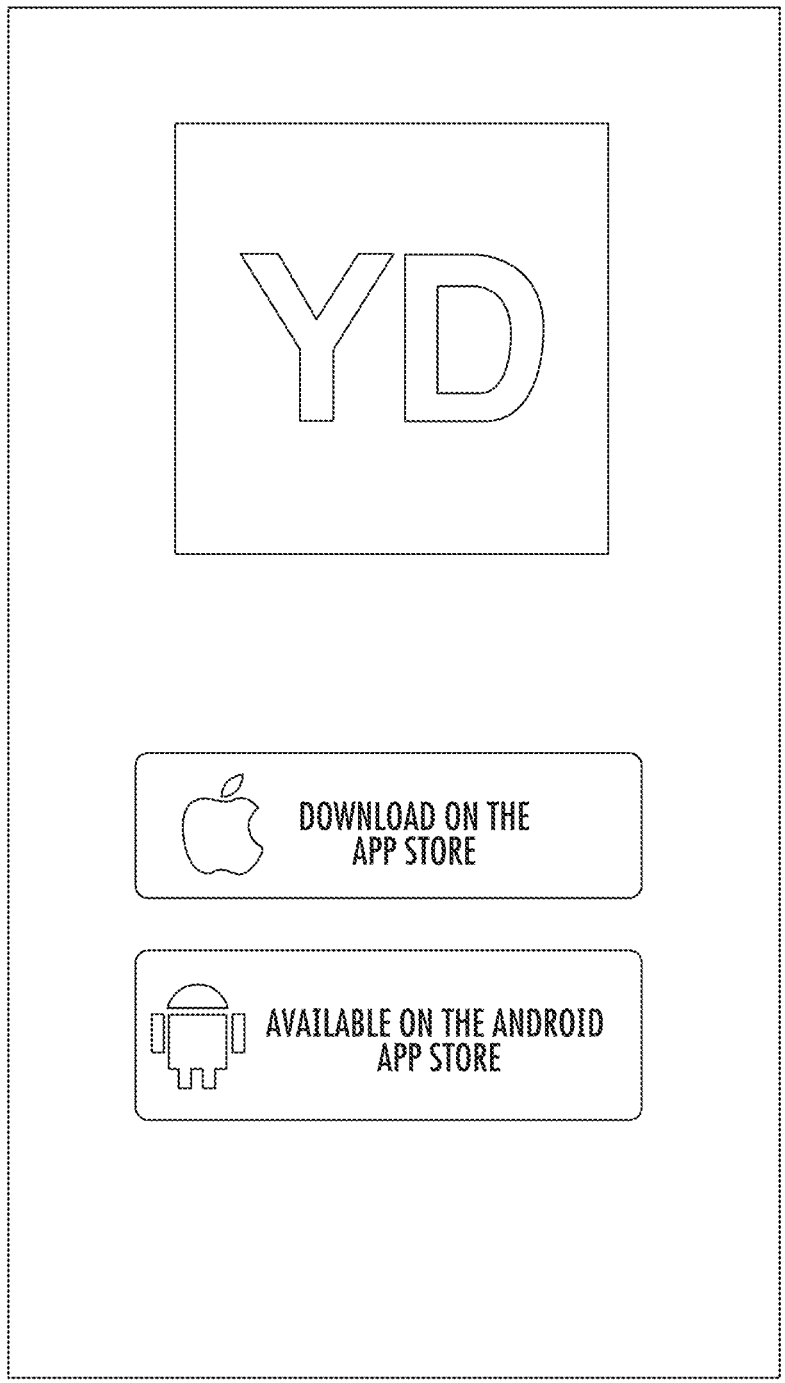
FIG. 12 is a screen shot from a mobile phone of a user.
Figure 13:
FIG. 13 is a screen shot from a mobile phone of a user illustrating example profile and consent information.
Figure 15:
FIG. 15 is a screen shot from a mobile phone of a user illustrating example profile and consent information.

FIGS. 12-23 illustrate an embodiment of the invention where a user may interact with the digital advertising platform using a mobile device, for example an application on a cellular phone. FIG. 12 illustrates that the YouDirect application may be downloaded and used on both the Android and Apple operating systems. FIGS. 13, 14, and 15 illustrate screen shots from a mobile phone of a user with example profile and consent information questions. In FIGS. 13, 14, and 15, information is divided into categories. For example, in FIGS. 13 and 14, categories include Basic Information, Financial Information, and Household Information, and in FIG. 15 Household Information, 2019 Life Events, and Online Activity. The number of questions in each category is provided and the status of completion. For example, in the category of Basic Information, three questions are provided and the user has provided answers to all three questions. For each category, there is a column entitled Consent to targeting. A user may choose whether the information provided in response to each question may be used for targeted advertising. As stated in FIG. 13, when the user consents to targeting, YouDirect uses your data to anonymously match you with relevant invitations. Your personal data is not shared with advertisers. In such a manner, a user may control which data is used to match the user with relevant invitations. Also shown at the bottom of FIGS. 13, 14, and 15 are screen selections of entitled Invitations, History, and Profile. The illustrated categories and questions are examples and other categories and questions are contemplated to be within the scope of the invention.

In an embodiment, user data, such as illustrated in FIGS. 13, 14, and 15, may be used to match the user with advertisers that identify similar target consumer attributes. A targeted advertisement may then be sent to the user based upon the shared data. In exchange for sharing their data, consumers earn rewards.

Figure 16:
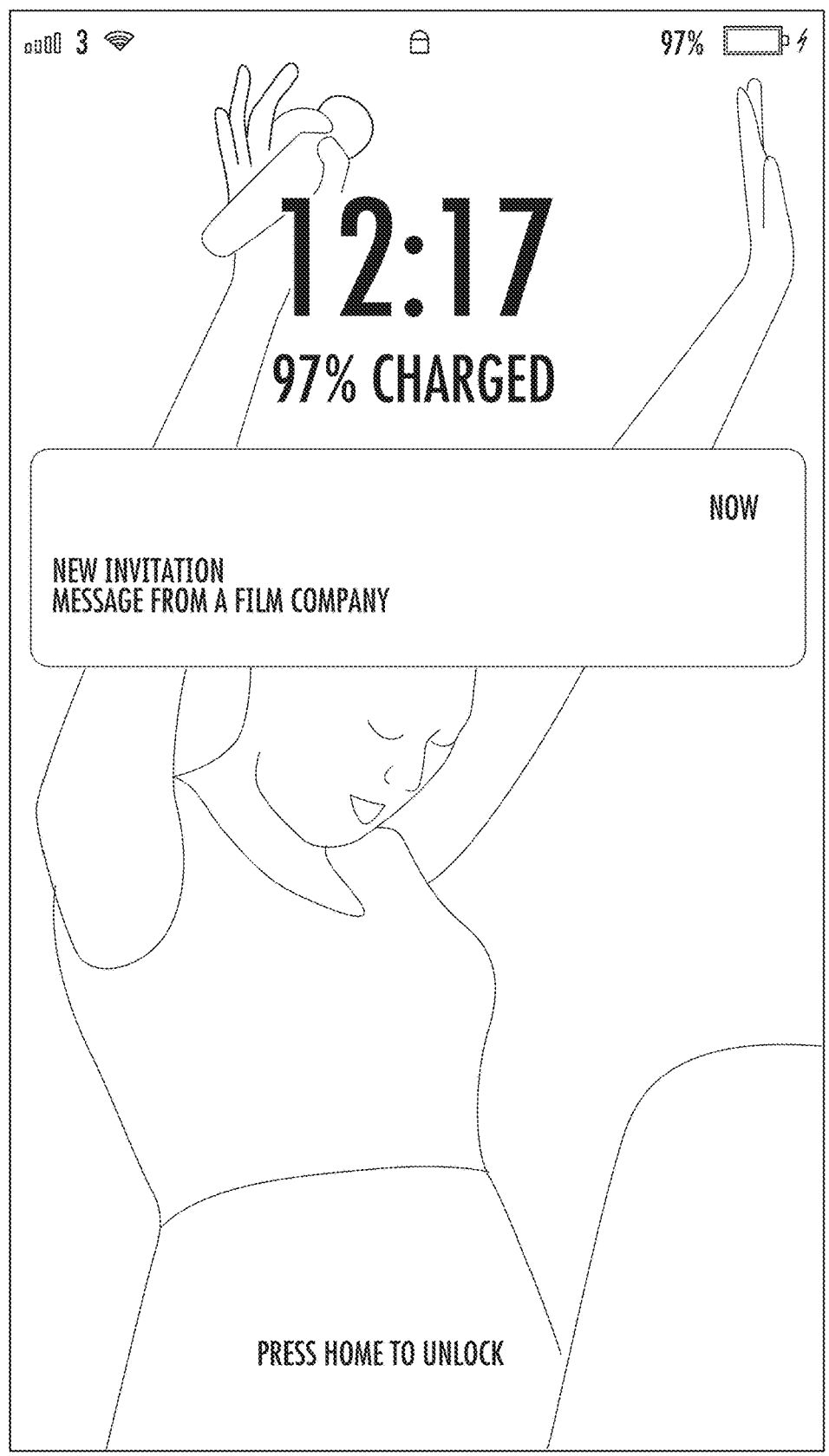
FIG. 16 is a screen shot from a mobile phone of a user illustrating an example of matching a users' profile and consent information to an interested third-party.

FIG. 16 is a screen shot from a mobile phone of a user illustrating an example of matching the profile and consent information of a user to an advertiser. As shown in FIG. 16, the user has been matched with a film company. The film company has sent an invitation to the user requesting interaction between the user and the film company. The user can choose to accept the invitation or decline the invitation.

Figure 17:
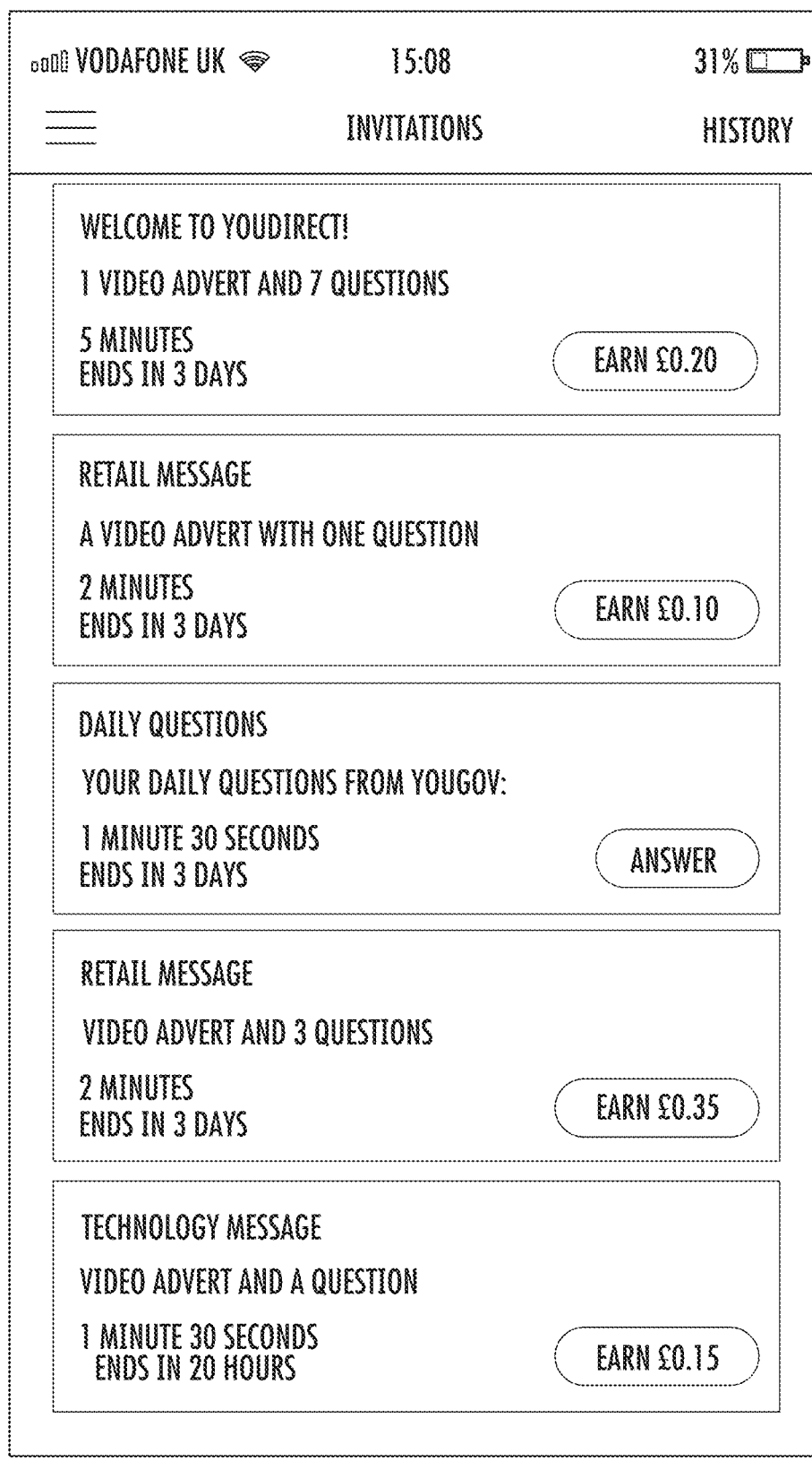
FIG. 17 is a screen shot from a mobile phone of a user illustrating example invitations to a user to share data in exchange for a reward.
Figure 19:
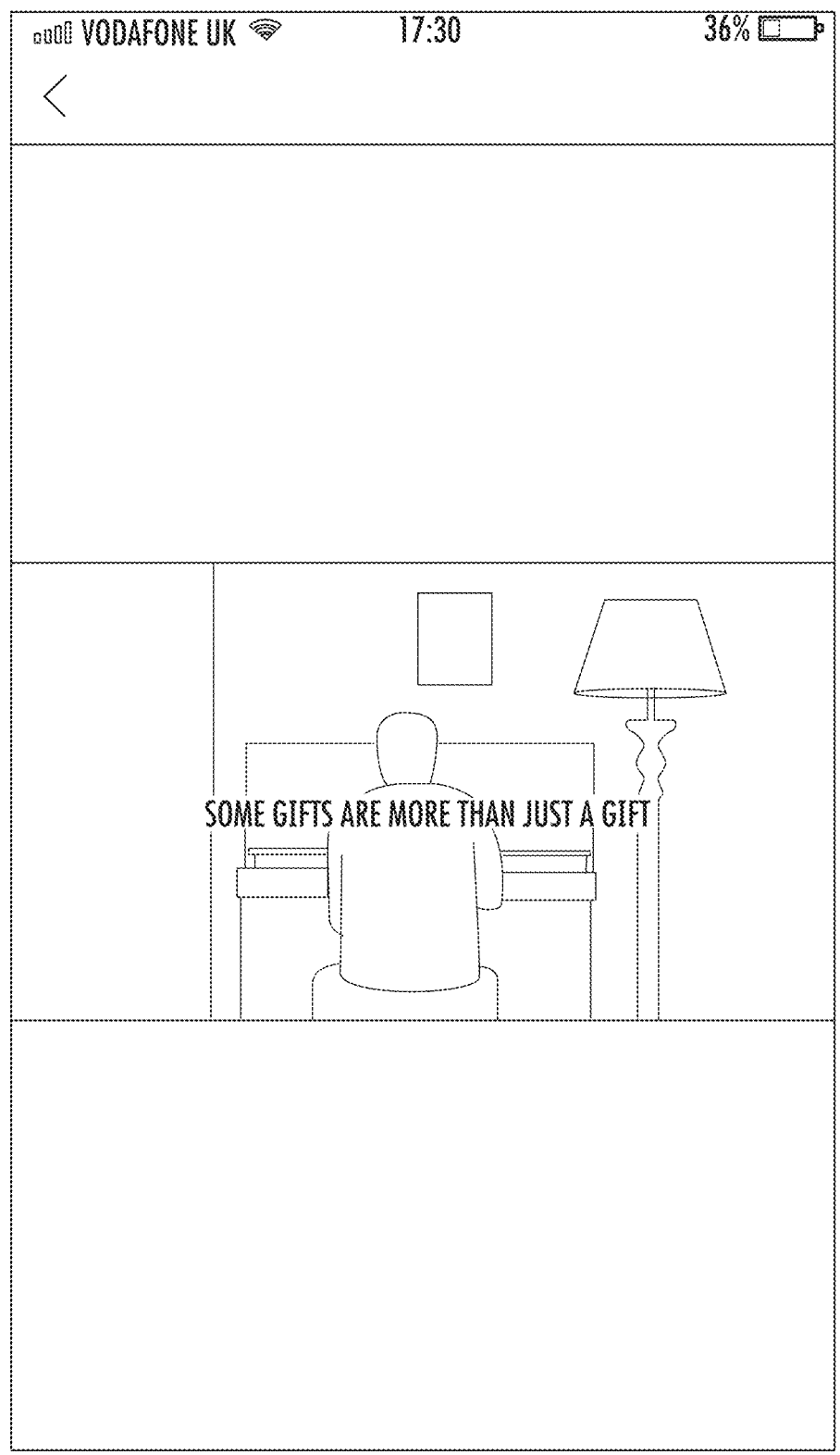
FIG. 19 is a screen shot from a mobile phone of a user illustrating an example of a targeted advertisement.

FIG. 17 is a screen shot from a mobile phone of a user illustrating example invitations and corresponding rewards. In the embodiment shown, the invitations may include targeted advertisements and questions, or just questions. The invitations may be from various third-parties that have expressed interest in the type of information the user is willing to share. FIG. 18 is a screen shot from a mobile phone of a user illustrating an example question when a user accepts an invitation. In the embodiment shown in FIG. 18, the user has agreed to watch a targeted video advertisement and answer at least one question. FIG. 19 is a screen shot from a mobile phone of a user illustrating an example of a targeted advertisement. FIG. 20 is a screen shot from a mobile phone of a user illustrating an example question when a user accepts an invitation.

Figure 21:
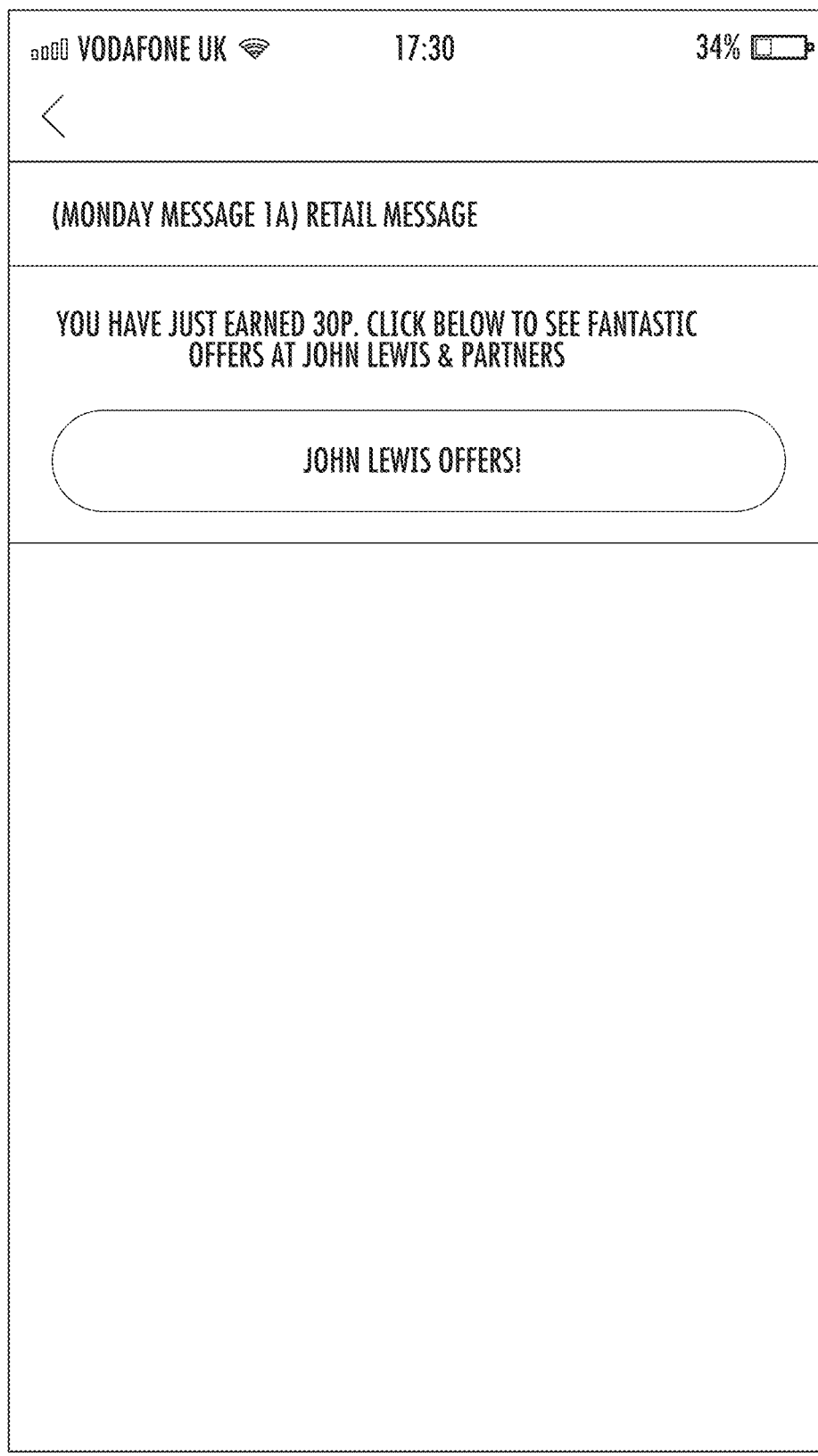
FIG. 21 is a screen shot from a mobile phone of a user illustrating an example reward.
Figure 22:
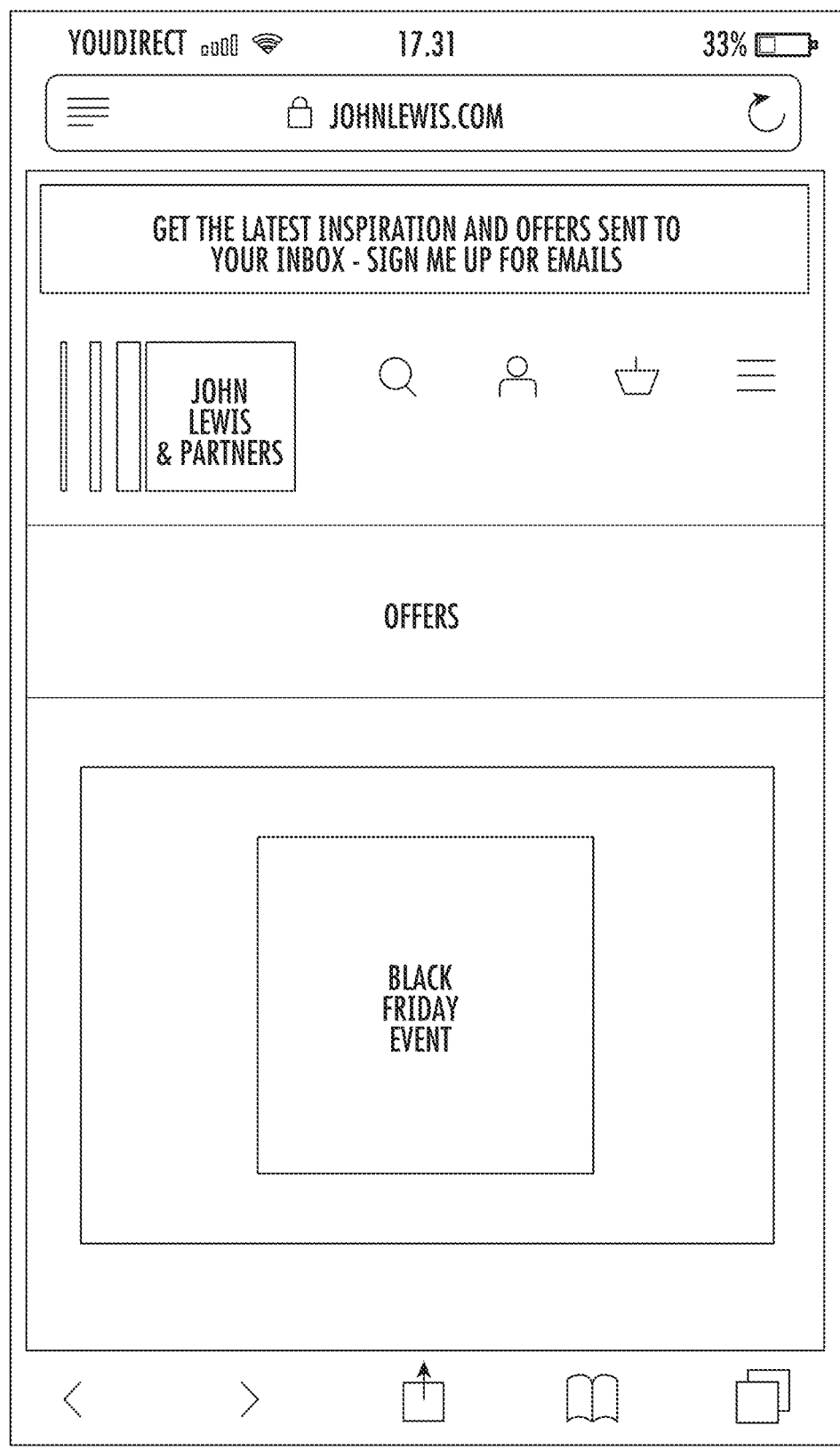
FIG. 22 is a screen shot from a mobile phone of a user illustrating an example of a targeted advertisement.

FIG. 21 is a screen shot from a mobile phone of a user illustrating an example reward. The reward may be in the form of money credited to an account or other reward such as points that can be redeemed. Also shown in FIG. 21 is a targeted offer from a third-party. The user can choose to proceed to view the offer or choose not to view the offer. FIG. 22 is a screen shot from a mobile phone of a user illustrating an example of a targeted advertisement by way of linking the user to the third-party website.

Figure 23:
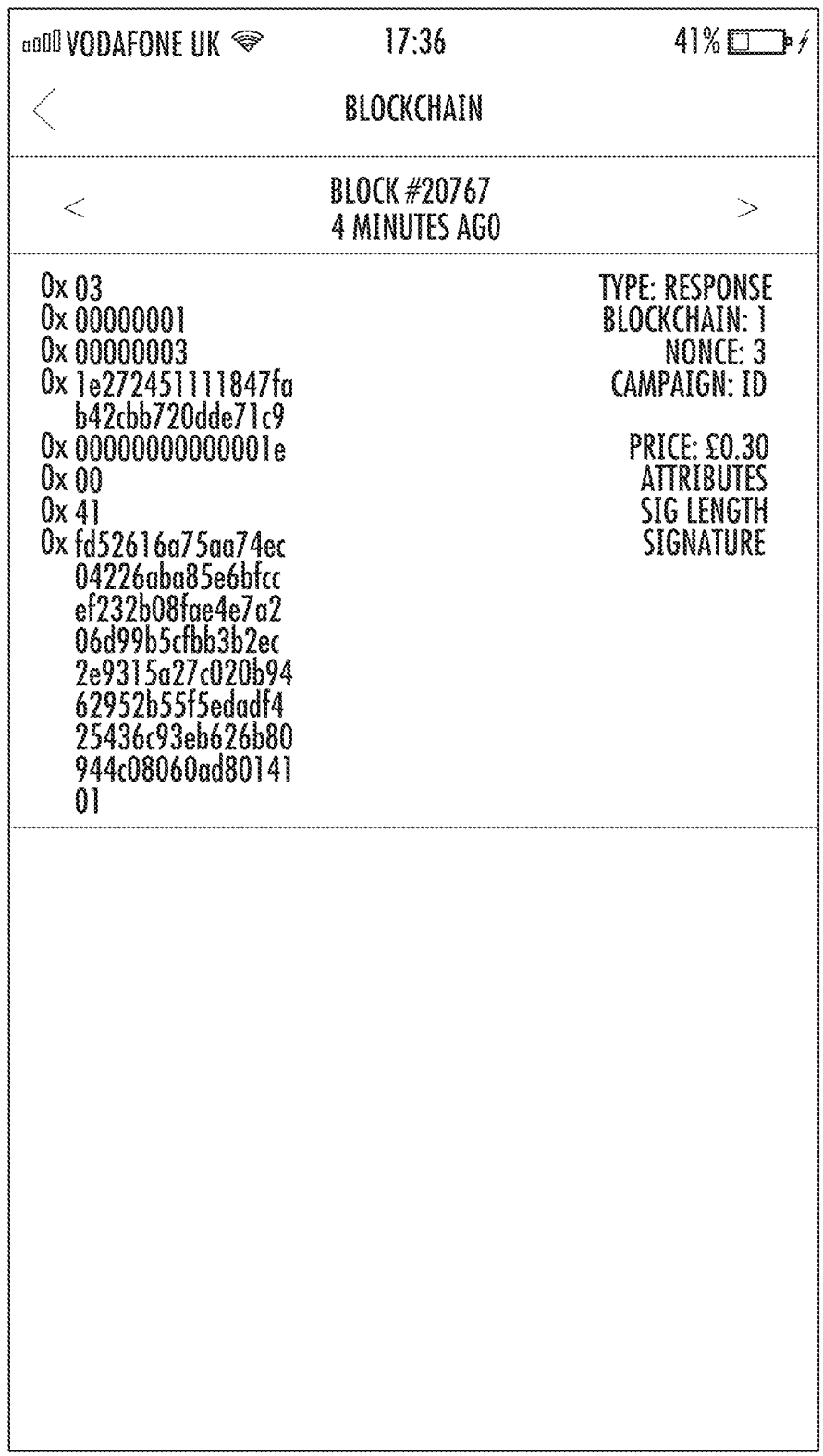
FIG. 23 is screen shot from a mobile phone of a user illustrating an example of the blockchain record of the transaction.

FIG. 23 is screen shot from a mobile phone of a user illustrating an example of the blockchain record of the transaction. In the embodiment shown, personal data is not a part of the blockchain. The blockchain record shown in FIG. 23 illustrates an encrypted ID, value, and the type of data being used.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

The invention claimed is:

1. A system comprising:
    a memory that stores instructions; and
    a processor that executes the instructions to perform operations, the operations comprising:
    receiving, from a first communication device and at a digital platform provided by the system, data permissions and attributes corresponding to a user, wherein the data permissions indicate consent to share a portion of the attributes with the digital platform for facilitating matching of the user with one or more third parties;
    certifying the attributes shared with the digital platform;
    create a particular blockchain address associated with the user on a blockchain;
    store, on the blockchain and at the blockchain address, the data permissions indicating the consent to share the portion of the attributes, wherein the association between the blockchain address and the user is unknown to third parties in order to maintain the user's privacy;
    receiving, from a second communication device and at the digital platform, target attributes required by a particular third party for receiving a targeted communication from the third party;
    generating, by the digital platform, particular targeted communication logic that specifies requirements for communicating target communications to users of the digital platform, wherein target communication logic generated by the digital platform corresponds to instruction code that, when executed by the system, causes the system to ensure that a particular targeted communication to a user conforms to particular target attributes associated with the particular targeted communication;
    for each instance of targeted communication logic:
        generating a child blockchain;
        assigning the targeted communication logic along with addresses associated with respective users of the digital platform to the generated child blockchain; and assigning each generated child blockchain to a common parent blockchain, wherein the parent blockchain includes block headers associated with each assigned child blockchain, wherein assigning each instance of targeted communication logic to a separate child blockchain of the parent blockchain facilitates parallel execution of the child blockchains, which reduces an amount of time required by the system to process a targeted communication logic transaction;

determining, via the digital platform, whether the portion of the attributes recorded at the blockchain address associated with the user matches the target attributes specified by the third party;

when the attributes recorded at the blockchain address associated with the user match the target attributes, providing, via the digital platform, the targeted communication from the third party to the user, wherein the targeted communication identifies further requested user input via the first communication device in exchange for one or more tokens provided via the blockchain, wherein the targeted communication includes an invitation for the user to provide additional information, wherein the additional information comprises user information that is not part of the user's blockchain profile, wherein the additional information is stored off of the blockchain in order to preserve the user's privacy and anonymity;

communicating, to the target communication logic, an indication that the user has interacted with the targeted communication, wherein the indication specifies the blockchain address associated with the user and a number of tokens associated with the targeted communication;

after determining, by the target communication logic, that i) the attributes recorded at the blockchain address that is specified in the indication match the target attributes associated with the targeted communication, and ii) the number of tokens specified in the indication is below an amount specified in the target communication logic to be associated with the targeted communication, communicating, by the target communication logic, the number of tokens specified in the indication to the blockchain address associated with the user.

2. The system of claim 1, wherein the first communication device is a cellular telephone.

3. The system of claim 1, wherein each attribute of the attributes corresponds with a separate data permission of the data permissions.

4. The system of claim 3, wherein an affirmative data permission by the user allows the corresponding attribute to be used to match the user with the third party.

5. The system of claim 3, wherein a negative data permission by the user precludes the corresponding attribute to be used to match the user with the third party.

6. The system of claim 1, wherein each attribute of the user has a corresponding value.

7. The system of claim 1, wherein the invitation for the user to provide the additional information includes invitation terms, wherein if the user accepts the invitation terms the user is provided a token.

8. The system of claim 7, wherein the token is associated a currency.

9. The system of claim 7, wherein the token is associated with a number of points.

10. A non-transitory computer-readable device comprising instructions, which when loaded and executed by a processor, cause the processor to perform operations comprising:

receiving, from a first communication device, data permissions and attributes from a user, wherein the data permissions indicate consent to share a portion of the attributes with a platform backend for facilitating matching of the user with a third party;

certifying the attributes shared with the platform backend;

communicating the data permission and attributes of the user to the platform backend;

storing, on a blockchain and by utilizing the platform backend, the data permissions indicating the consent to share the portion of the attributes on a blockchain profile associated with the user, wherein the association between the blockchain profile and the user is unknown to the third party in order to maintain the user's privacy;

generating particular targeted communication logic that specifies requirements for communicating target communications to users of the platform, wherein the target communication logic corresponds to instruction code that, when executed by the processor, causes the processor to ensure that a particular targeted communication to a user conforms to particular target attributes associated with the particular targeted communication;

for each instance of targeted communication logic:
generating a child blockchain;
assigning the targeted communication logic along with addresses associated with respective users to the generated child blockchain; and
assigning each generated child blockchain to a common parent blockchain, wherein the parent blockchain includes block headers associated with each assigned child blockchain, wherein assigning each instance of targeted communication logic to a separate child blockchain of the parent blockchain facilitates parallel execution of the child blockchains, which reduces an amount of time required by the processor to process a targeted communication logic transaction;

determining, by utilizing the platform backend, whether the portion of the attributes recorded in the blockchain profile of the user matches target attributes provided by the third party for receiving a targeted communication from the third party; and, receiving, on the first communication device, the targeted communication based on the data permissions and attributes of the user correlating with the target attributes for receiving the targeted communication from the third party, wherein the targeted communication identifies further requested user input via the first communication device in exchange for one or more tokens provided via the blockchain, wherein the targeted communication includes an invitation for the user to provide additional information, wherein the additional information comprises user information that is not part of the blockchain profile, wherein the additional information is stored off the blockchain in order to preserve the user's privacy and anonymity.

11. The non-transitory computer-readable device of claim 10, where the operation of communicating the data permission and attributes of the user to the platform backend is performed using the blockchain.

12. A non-transitory computer-readable device comprising instructions, which when loaded and executed by a processor, cause the processor to perform operations comprising:
- receiving, from a communication device, target attributes from a third party, wherein the target attributes are associated with a targeted communication provided by the third party;
- providing, on a blockchain, data permissions and attributes corresponding to a user to a blockchain profile associated with the user, wherein the data permissions indicate consent to share a portion of the attributes with a data platform to facilitate matching of the user with the targeted communication the third party, wherein the association between the blockchain profile and the user is unknown to the third party in order to maintain the user's privacy;
- generating particular targeted communication logic that specifies requirements for communicating target communications to users of the data platform, wherein target communication logic corresponds to instruction code that, when executed by the processor, causes the processor to ensure that a particular targeted communication to a user conforms to particular target attributes associated with the particular targeted communication;
- for each instance of targeted communication logic:
  - generating a child blockchain;
  - assigning the targeted communication logic along with addresses associated with respective users to the generated child blockchain; and
  - assigning each generated child blockchain to a common parent blockchain, wherein the parent blockchain includes block headers associated with each assigned child blockchain, wherein assigning each instance of targeted communication logic to a separate child blockchain of the parent blockchain facilitates parallel execution of the child blockchains, which reduces an amount of time required by the processor to process a targeted communication logic transaction;
- certifying the attributes shared with the data platform;
- matching, using the data platform, the target attributes with the data permissions and the attributes of the blockchain profile of the user;
- based on the matching, communicating to the user the targeted communication to provide additional information to the third party, wherein the additional information comprises user information that is not part of the blockchain profile, wherein the additional information is stored off of the blockchain in order to preserve the user's privacy and anonymity; and
- providing a transaction record on the blockchain indicating that the user provided the additional information to the third party in response to the targeted communication.

13. The non-transitory computer-readable device of claim 12, further comprising the operation of receiving the additional information from the user and recording an event associated with the additional information with the blockchain.

14. A method comprising:
- receiving, by utilizing instructions from a memory that are executed by a processor, a selection of data permissions and attributes corresponding to a user to share with a third party, wherein the data permissions indicate consent to a share a portion of the attributes with the third party via a data platform for facilitating matching of the user with the third party;
- certifying the attributes shared with the data platform;
- storing, on a blockchain and by utilizing the data platform, the data permissions indicating the consent to share the portion of the attributes on a blockchain profile associated with the user, wherein the association between the blockchain profile and the user is unknown to the third party in order to maintain the user's privacy;
- generating particular targeted communication logic that specifies requirements for communicating target communications to users, wherein the target communication logic corresponds to instruction code that, when executed by a processor, causes a processor to ensure that a particular targeted communication to a user conforms to particular target attributes associated with the particular targeted communication;
- for each instance of targeted communication logic:
  - generating a child blockchain;
  - assigning the targeted communication logic along with addresses associated with respective users to the generated child blockchain; and
  - assigning each generated child blockchain to a common parent blockchain, wherein the parent blockchain includes block headers associated with each assigned child blockchain, wherein assigning each instance of targeted communication logic to a separate child blockchain of the parent blockchain facilitates parallel execution of the child blockchains, which reduces an amount of time required by the processor to process a targeted communication logic transaction;
- receiving a targeted communication from the third party to share additional information based upon the portion of the attributes matching target attributes for receiving the invitation from the third party, wherein the additional information comprises user information that is not part of the blockchain profile, wherein the additional information is stored off of the blockchain in order to preserve the user's privacy and anonymity;
- facilitating, via the data platform, acceptance of the targeted communication from the third party and sharing the additional information;
- facilitating, via the blockchain, receipt of one or more tokens for sharing the additional information with the third party; and
- generating a transaction record on the blockchain indicating acceptance of the targeted communication, the sharing of the additional information, and the receipt of the one or more tokens.

15. The method of claim 14, wherein the one or more tokens are associated with a currency.

* * * * *